United States Patent
Kim et al.

(10) Patent No.: US 9,161,021 B2
(45) Date of Patent: Oct. 13, 2015

(54) MOBILE TERMINAL AND METHOD FOR CONVERTING DISPLAY MODE BETWEEN TWO-DIMENSIONAL AND THREE-DIMENSIONAL MODES

(75) Inventors: Jonghwan Kim, Incheon (KR); Ahyun Park, Seongnam-si (KR); Hyunho Jee, Incheon (KR); Donggwan Im, Seoul (KR); Doyoung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 981 days.

(21) Appl. No.: 13/084,589

(22) Filed: Apr. 12, 2011

(65) Prior Publication Data

US 2012/0044243 A1  Feb. 23, 2012

(30) Foreign Application Priority Data

Aug. 17, 2010 (KR) ........................ 10-2010-0079214

(51) Int. Cl.
- *G06F 3/048* (2013.01)
- *H04N 13/04* (2006.01)
- *G06F 3/0488* (2013.01)

(52) U.S. Cl.
CPC ........ *H04N 13/0402* (2013.01); *G06F 3/04883* (2013.01); *H04N 13/0429* (2013.01); *H04N 13/0456* (2013.01); *G06T 2200/24* (2013.01)

(58) Field of Classification Search
CPC .................. H04N 13/0402; G06T 2200/24
USPC ...................................................... 715/848
See application file for complete search history.

(56) References Cited

U.S. PATENT DOCUMENTS

| | | | |
|---|---|---|---|
| 2002/0008906 A1 | 1/2002 | Tomita | |
| 2004/0004616 A1 | 1/2004 | Konya et al. | |
| 2006/0139448 A1 | 6/2006 | Ha et al. | |
| 2006/0279750 A1* | 12/2006 | Ha | 358/1.2 |
| 2007/0002041 A1* | 1/2007 | Kim et al. | 345/419 |
| 2009/0237494 A1 | 9/2009 | Oota et al. | |
| 2010/0095206 A1 | 4/2010 | Kim | |
| 2010/0182311 A1* | 7/2010 | Kim | 345/419 |
| 2010/0225740 A1* | 9/2010 | Jung et al. | 348/42 |
| 2011/0074934 A1* | 3/2011 | Ko et al. | 715/810 |
| 2011/0096155 A1* | 4/2011 | Choo et al. | 348/58 |

FOREIGN PATENT DOCUMENTS

| | | |
|---|---|---|
| CN | 1471322 A | 1/2004 |
| CN | 101571787 A | 11/2009 |
| CN | 101620507 A | 1/2010 |
| WO | WO 2009/105544 A2 | 8/2009 |

* cited by examiner

*Primary Examiner* — Jennifer To
*Assistant Examiner* — Joseph R Burwell
(74) *Attorney, Agent, or Firm* — Birch, Stewart, Kolasch & Birch, LLP

(57) ABSTRACT

A mobile terminal and a method for converting a display mode thereof are disclosed. The mobile terminal performs a first display action for three-dimensionally displaying a part of a image in a first zone of an entire display zone and two-dimensionally displaying the other part of the image in a second zone as a gesture externally input for conversion between two-dimensional display and three-dimensional display is recognized, and performs a second display action subsequently to the first display action for three-dimensionally displaying a part of the image in a third zone of the entire display zone and two-dimensionally displaying the other part of the image in a fourth zone.

16 Claims, 29 Drawing Sheets

--Prior Art--

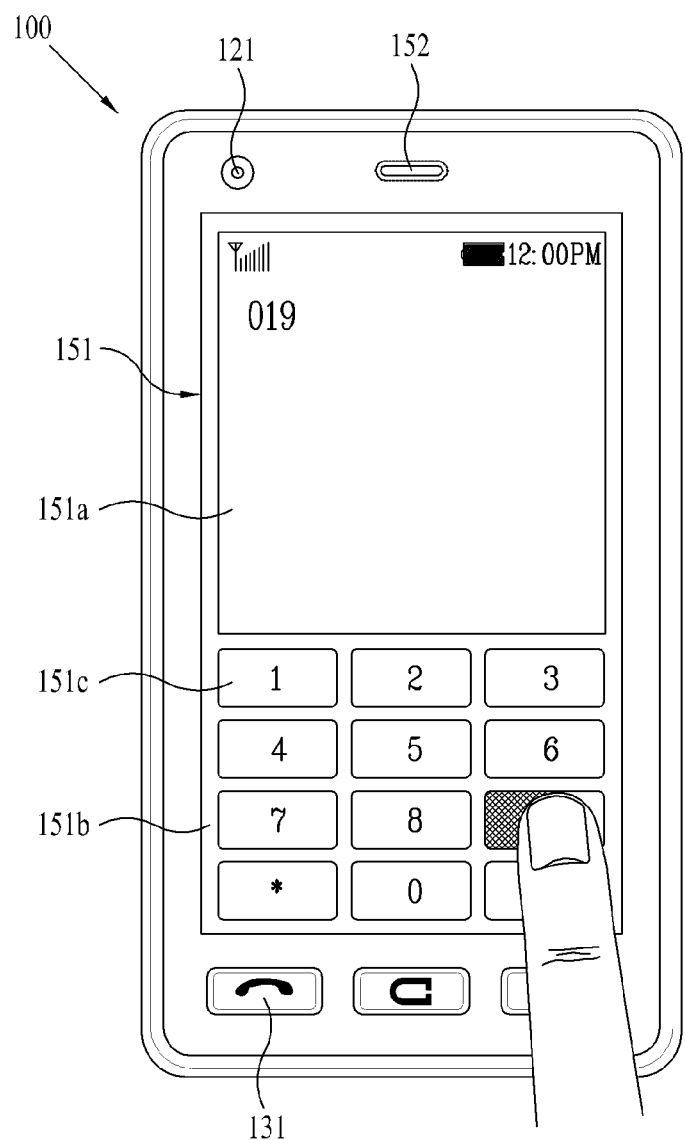

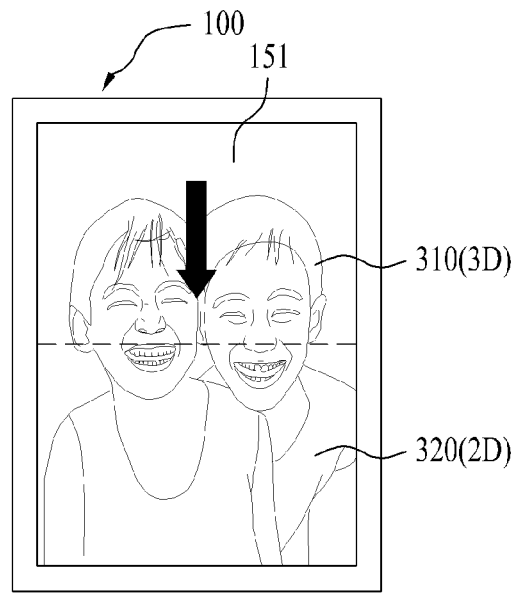
(a)
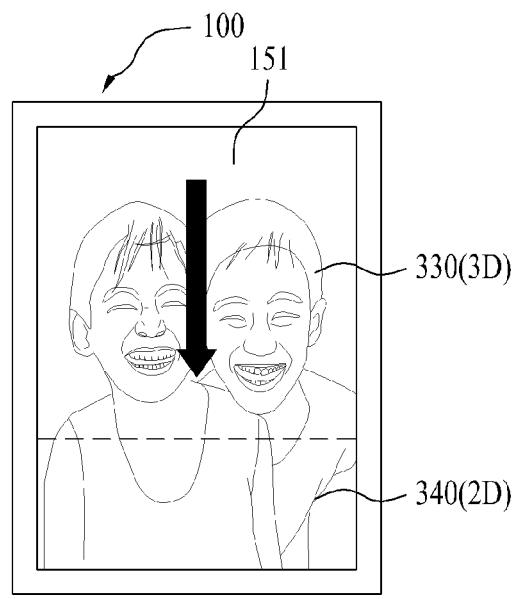
(b)

Initial 2D screen

Long press using three fingers (lapse of 2 seconds)

Long press using three fingers (lapse of 4 seconds)

Initial 3D screen

Long press using two fingers (lapse of 2 seconds)

Long press using two fingers (lapse of 4 seconds)

Initial 2D screen

Initial 3D screen

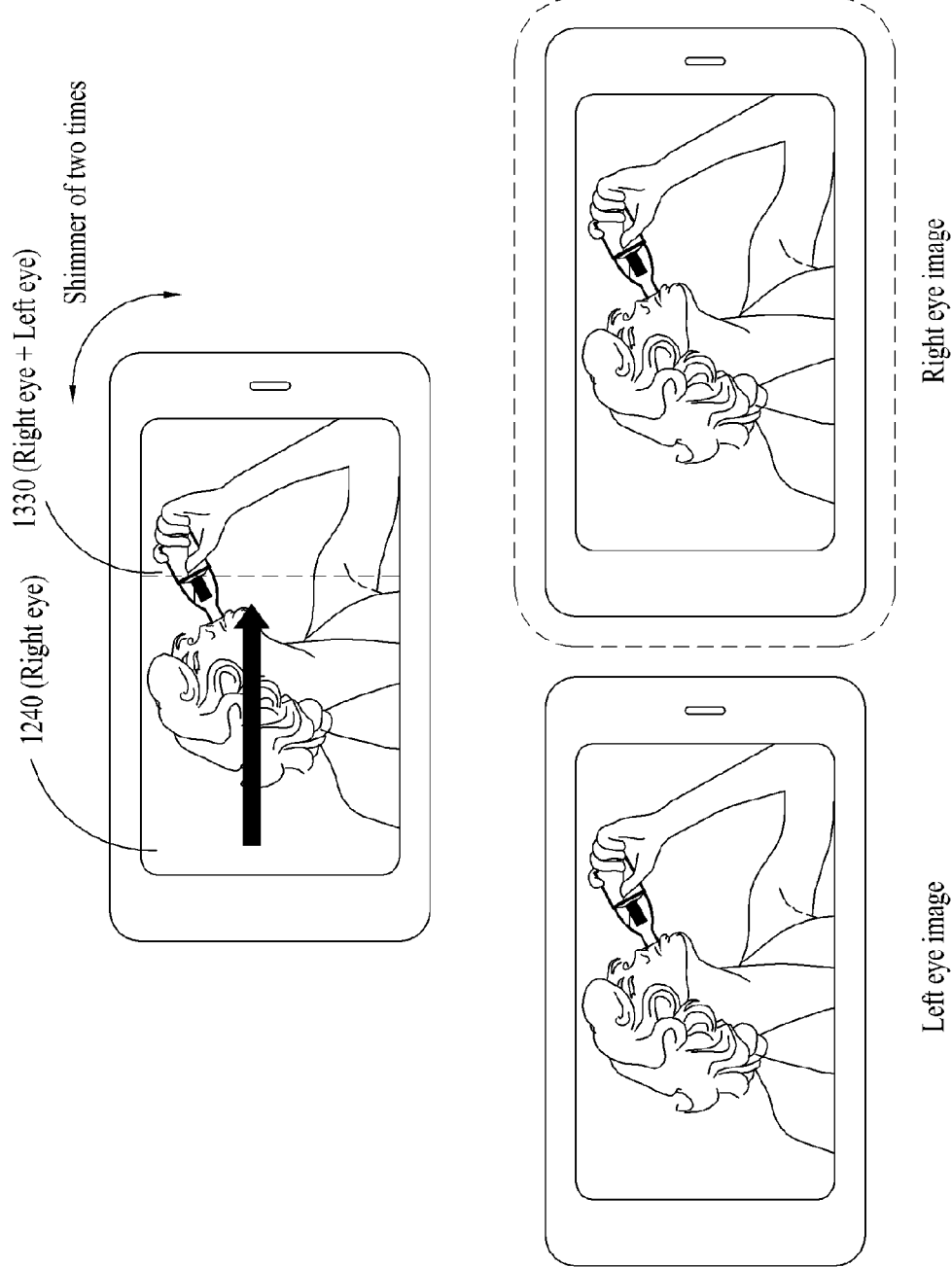

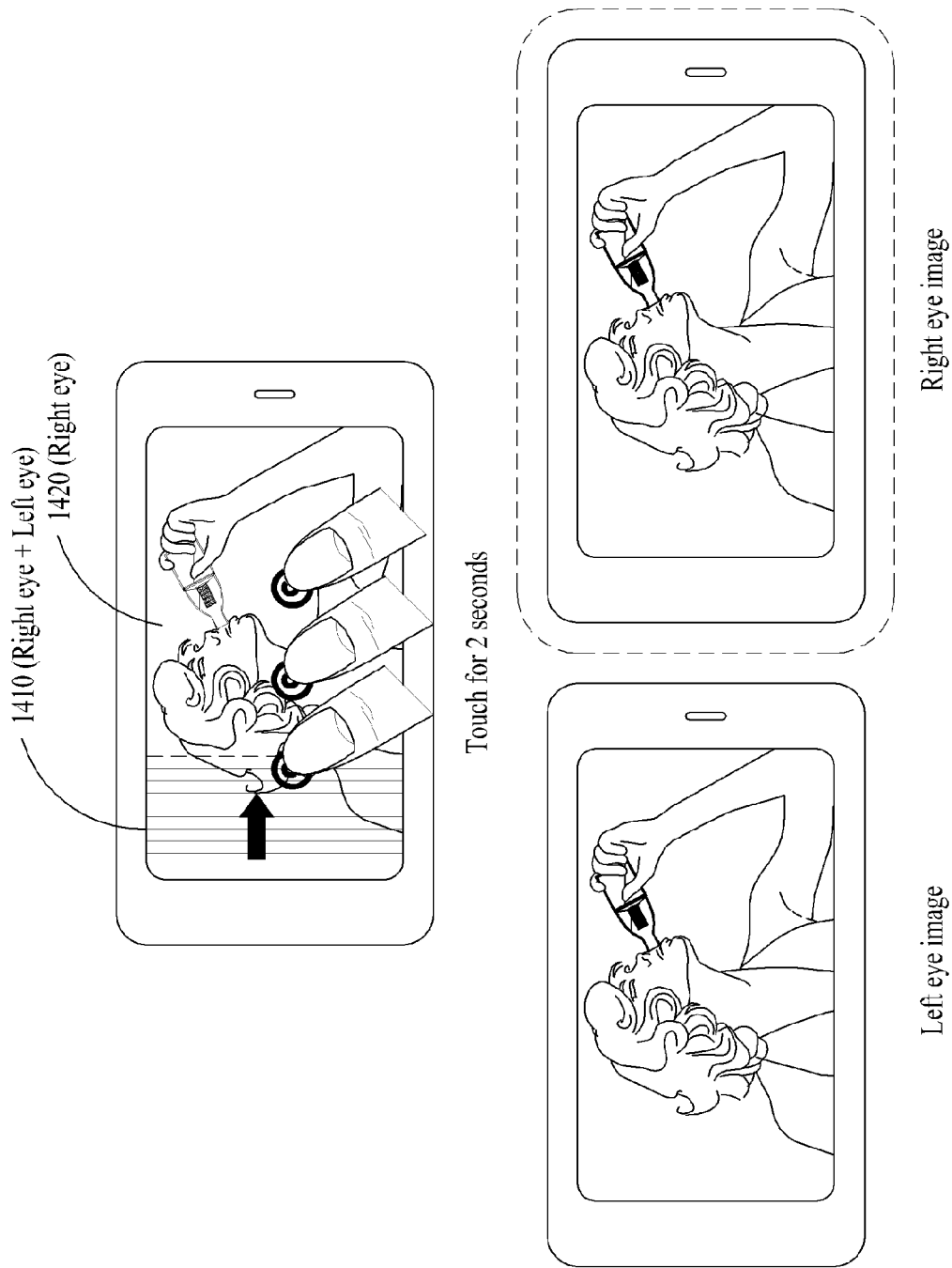

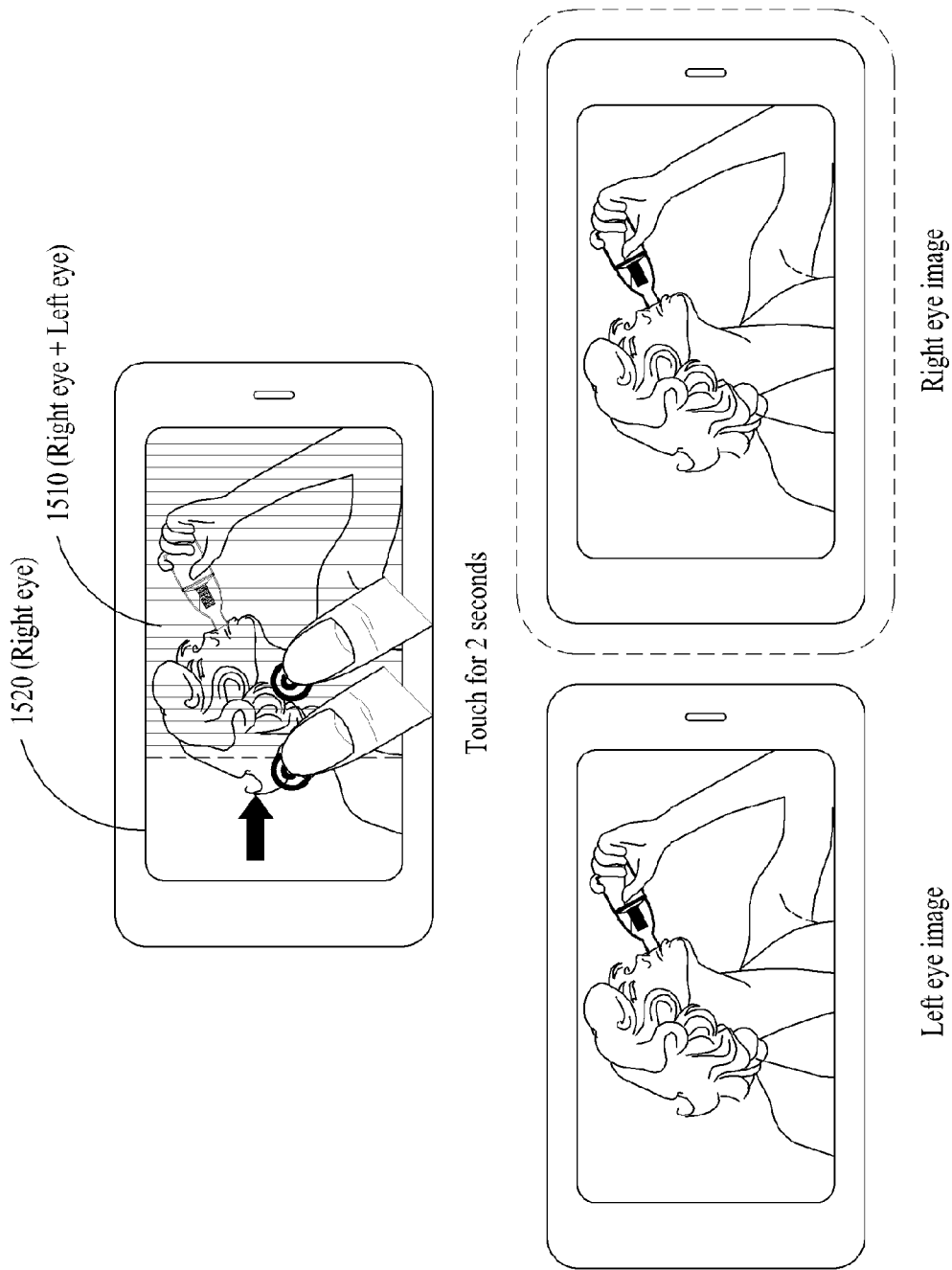

FIG. 17A
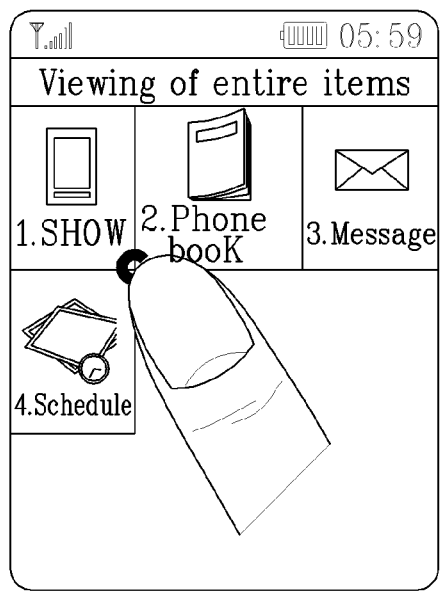
(a)
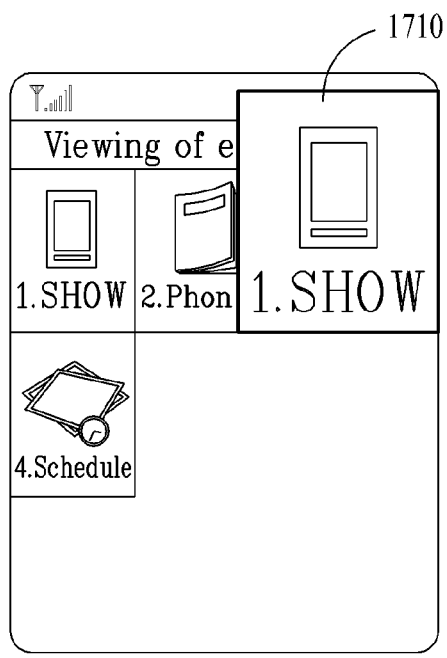
(b)

FIG. 17B
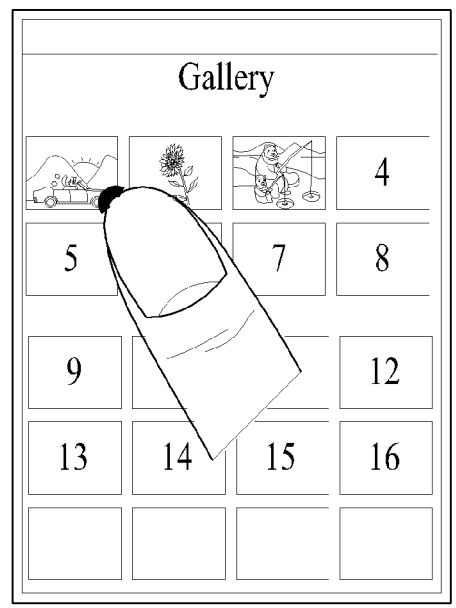
(a)
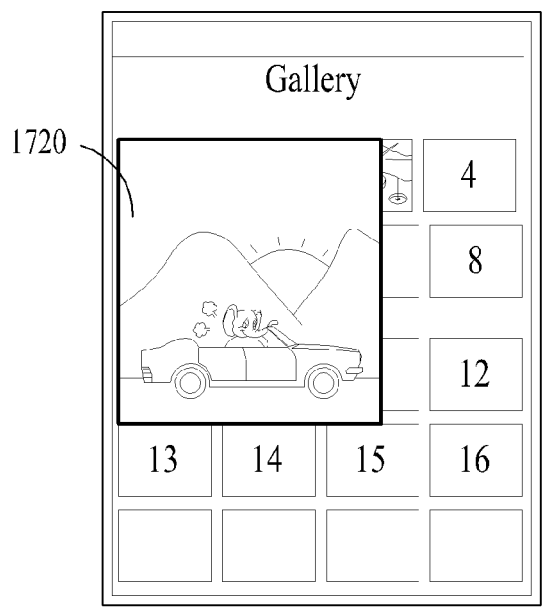
(b)

FIG. 17C
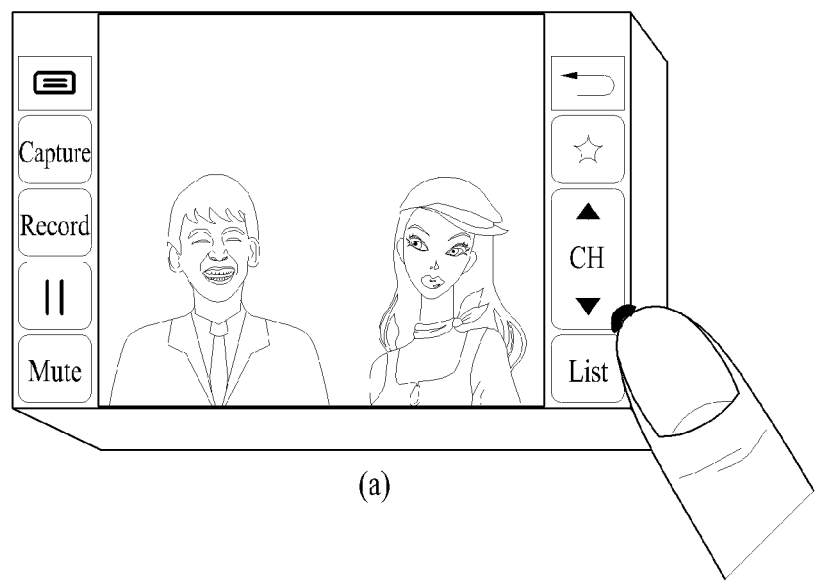
(a)
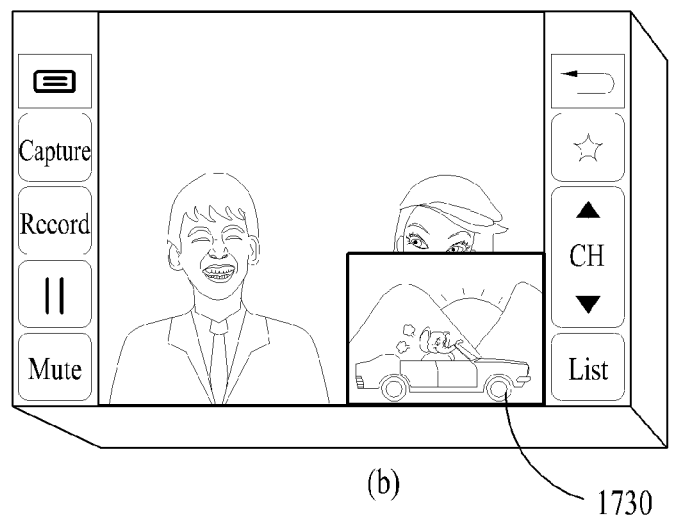
(b) — 1730

FIG. 18A
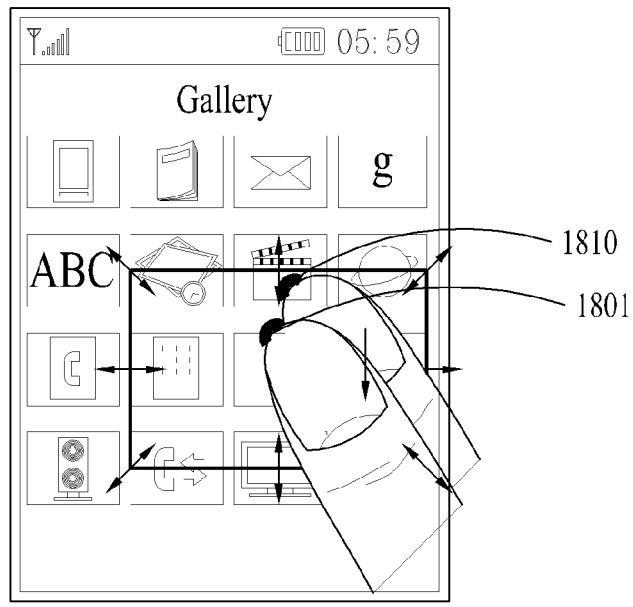
(a)
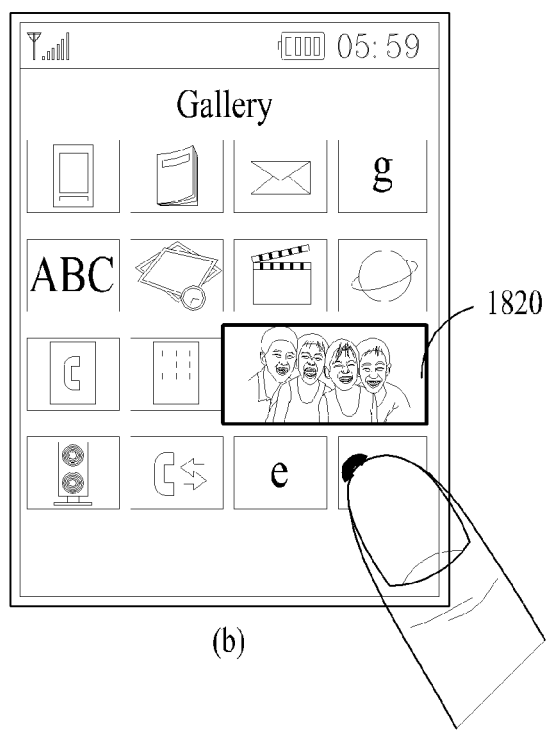
(b)

FIG. 18B
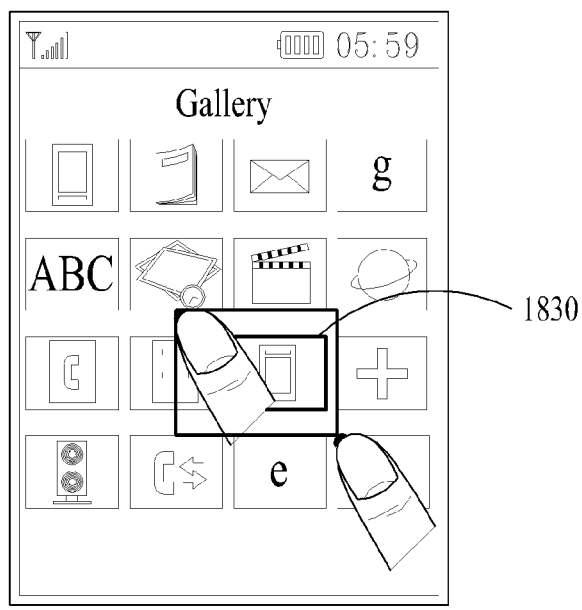
(a)
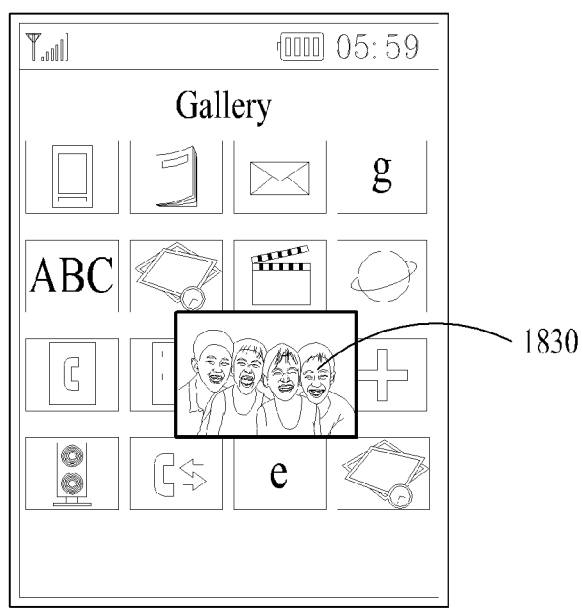
(b)

(a)            (b)

FIG. 19B
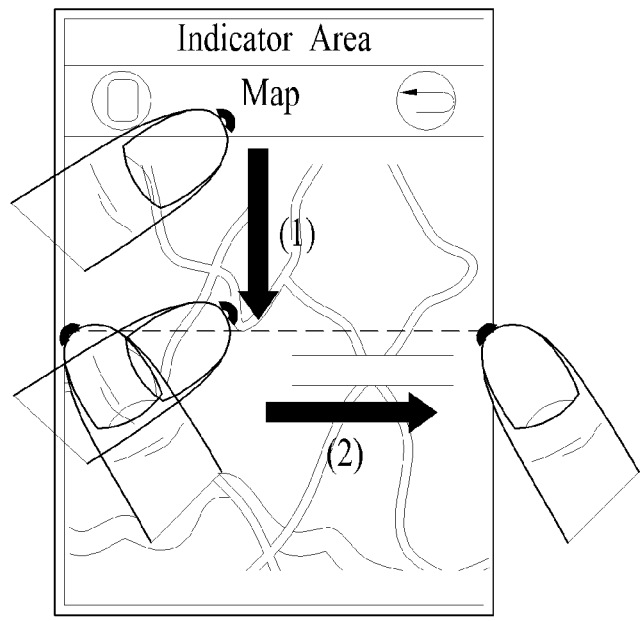
(a)
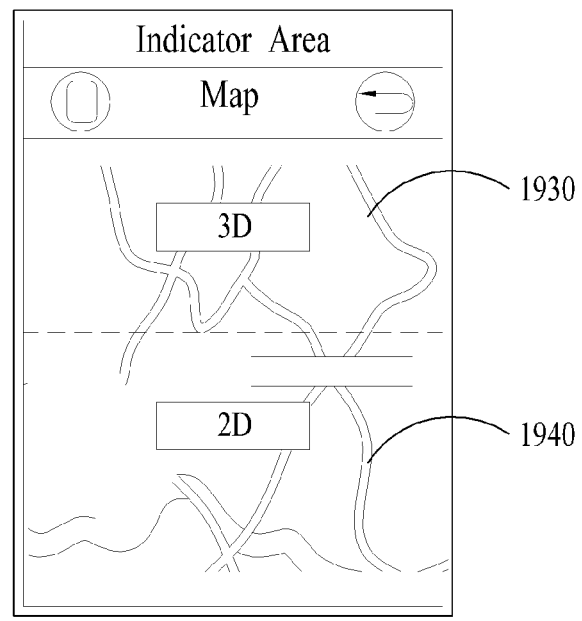
(b)

MOBILE TERMINAL AND METHOD FOR CONVERTING DISPLAY MODE BETWEEN TWO-DIMENSIONAL AND THREE-DIMENSIONAL MODES

This application claims the benefit of the Korean Patent Application No. 10-2010-0079214, filed on Aug. 17, 2010, which is hereby incorporated by reference as if fully set forth herein.

BACKGROUND OF THE INVENTION

1. Field of the Invention

The present invention relates to a mobile terminal that can convert a display mode between two-dimensional display and three-dimensional display and a method for converting a display mode thereof.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural part and/or software part of the terminal.

Generally, when the mobile terminal according to the related art performs a conversion operation between two-dimensional display and three-dimensional display, it can perform a converting process at one time based on a converting time without continuously providing the converting process to a user.

Accordingly, according to the related art, the converting process of the display mode may be regarded as unnatural to the user who is continuously viewing the screen.

SUMMARY OF THE INVENTION

Accordingly, the present invention is directed to a mobile terminal and a method for converting a display mode thereof, which substantially obviate ones or more problems due to limitations and disadvantages of the related art.

An object of the present invention is to provide a mobile terminal and a method for converting a display mode thereof, in which a converting process between two-dimensional display and three-dimensional display can gradually be enlarged from a part to the entire.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention comprises a display module displaying an image in an entire display zone; a sensing unit recognizing a gesture externally input for conversion between two-dimensional display and three-dimensional display; and a controller controlling the display module to perform a first display action for three-dimensionally displaying a part of the image in a first zone of the entire display zone and two-dimensionally displaying the other part of the image in a second zone as the gesture is recognized, and to perform a second display action for three-dimensionally displaying a part of the image in a third zone of the entire display zone subsequently to the first display action and two-dimensionally displaying the other part of the image in a fourth zone.

In this case, if the image is two-dimensionally displayed in the entire display zone before the gesture is input, the first zone corresponds to the third zone and the fourth zone corresponds to the second zone. Also, if the image is three-dimensionally displayed in the entire display zone before the gesture is input, the third zone corresponds to the first zone and the second zone corresponds to the fourth zone.

In another aspect of the present invention, a method for converting a display mode of a mobile terminal comprises a first display step of displaying an image in an entire display zone; recognizing a gesture externally input for conversion between two-dimensional display and three-dimensional display; a second display step of three-dimensionally displaying a part of the image in a first zone of the entire display zone and two-dimensionally displaying the other part of the image in a second zone as the gesture is recognized; and a third display step of three-dimensionally displaying a part of the image in a third zone of the entire display zone subsequently to the first display action and two-dimensionally displaying the other part of the image in a fourth zone.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is front diagram of a mobile terminal according to one embodiment of the present invention for explaining one operational status of the mobile terminal;

FIG. 3 is a screen schematic view illustrating that a mobile terminal according to one embodiment of the present invention partially performs a converting process of a display mode;

FIG. 13A to FIG. 13C are screen schematic views illustrating that a three-dimensional display mode is partially converted to a two-dimensional display mode by controlling binocular images depending on the number of shimmer times in accordance with the present invention;

FIG. 14A and FIG. 14B are screen schematic views illustrating that a two-dimensional display mode is partially converted to a three-dimensional display mode by controlling binocular images depending on a touch time in accordance with the present invention;

FIG. 15A and FIG. 15B are screen schematic views illustrating that a three-dimensional display mode is partially converted to a two-dimensional display mode by controlling binocular images depending on a touch time in accordance with the present invention;

FIG. 17A to FIG. 17C are screen schematic views illustrating that a specific image of two-dimensional display images is displayed three-dimensionally in a zone previously designated in accordance with the present invention; and FIG. 18A to FIG. 19B are screen schematic views illustrating that a specific image of two-dimensional display images is displayed three-dimensionally in a zone set by a user in accordance with the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Reference will now be made in detail to the preferred embodiments of the present invention, examples of which are illustrated in the accompanying drawings. Wherever possible, the same reference numbers will be used throughout the drawings to refer to the same or like parts. The suffixes 'module' and 'unit' for the elements used in the following description are given or used in common by considering facilitation in writing this disclosure only but fail to have meanings or roles discriminated from each other.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except a case applicable to a mobile terminal only, it is apparent to those skilled in the art that the configurations according to an embodiment described in this disclosure is applicable to such a stationary terminal as a digital TV, a desktop computer and the like.

Figure 1:
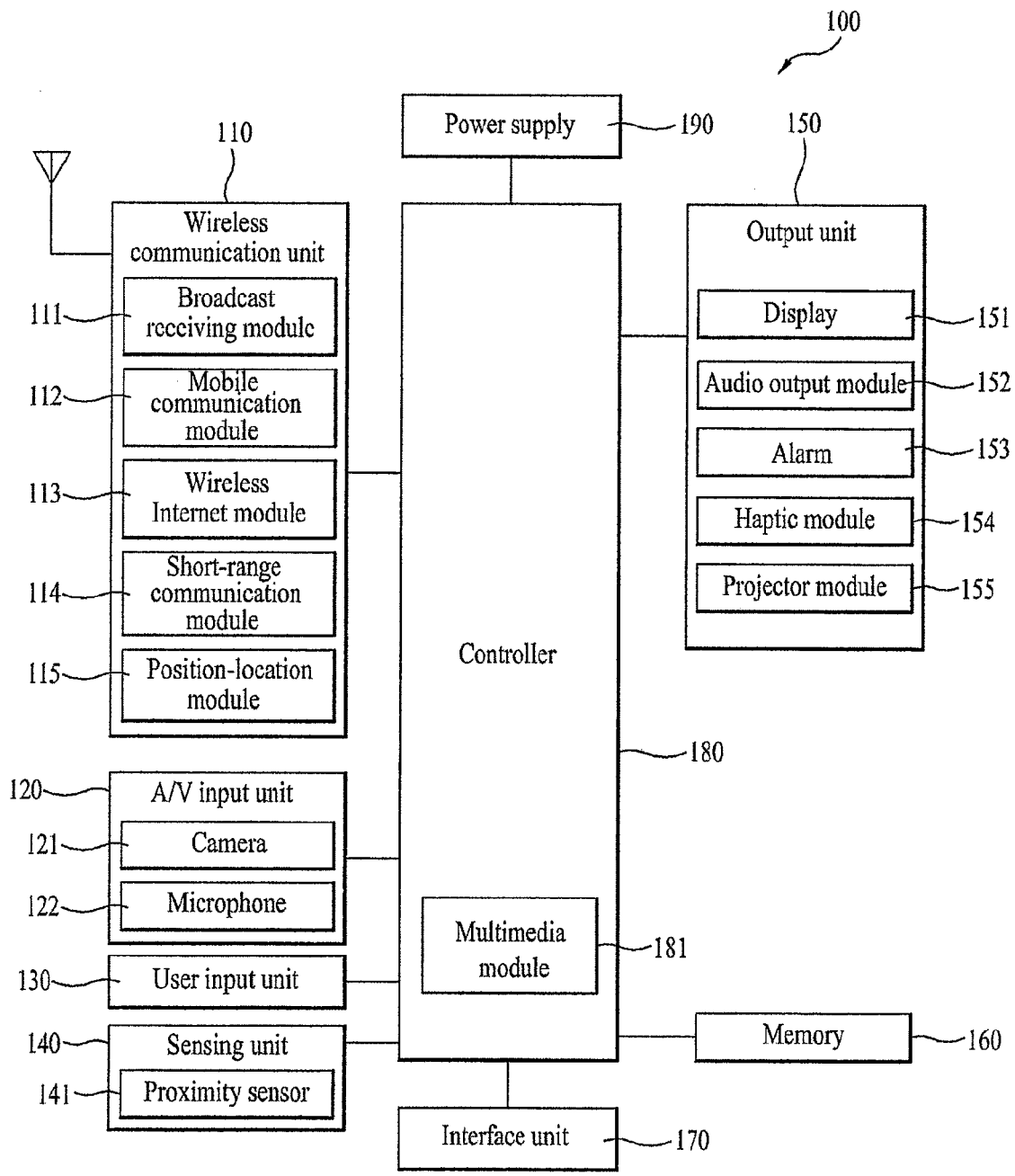
FIG. 1 is a block diagram of a mobile terminal according to one embodiment of the present invention.

FIG. 1 is a block diagram of a mobile terminal according to one embodiment of the present invention.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display module 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display module 151, an audio output module 152, an alarm module 153, a haptic module 154, a projector module 155 and the like.

The display module 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display module 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display module 151 can be implemented in the optical transmittive type as well. In this configuration, a user is able to see an object in rear of a terminal body via the area occupied by the display module 151 of the terminal body.

At least two display modules 151 can be provided to the mobile terminal 100 in accordance with the implemented configuration of the mobile terminal 100. For instance, a plurality of display modules can be arranged on a single face of the mobile terminal 100 in a manner of being spaced apart from each other or being built in one body. Alternatively, a plurality of display modules can be arranged on different faces of the mobile terminal 100.

In case that the display module 151 and a sensor for detecting a touch action (hereinafter called 'touch sensor') configures a mutual layer structure (hereinafter called 'touchscreen'), it is able to use the display module 151 as an input device as well as an output device. In this case, the touch sensor can be configured as a touch film, a touch sheet, a touchpad or the like.

The touch sensor can be configured to convert a pressure applied to a specific portion of the display module 151 or a variation of a capacitance generated from a specific portion of the display module 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display module 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm module 153 is output a signal for announcing the occurrence of a particular event associated with the mobile terminal 100. Typical events include a call received event, a message received event and a touch input received event. The alarm module 153 is able to output a signal for announcing the event occurrence by way of vibration as well as video or audio signal. The video or audio signal can be outputted via the display module 151 or the audio output unit 152. Hence, the display module 151 or the audio output module 152 can be regarded as a part of the alarm module 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display module 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Interconnected operational mechanism between the display module 151 and the touchpad (not shown) is explained with reference to FIG. 2 as follows.

FIG. 2 is front-view diagram of a terminal according to one embodiment of the present invention for explaining an operational state thereof.

First of all, various kinds of visual information can be displayed on the display module 151. And, theses information can be displayed in characters, numerals, symbols, graphics, icons and the like.

In order to input the information, at least one of the characters, numerals, symbols, graphics and icons are represented as a single predetermined array to be implemented in a keypad formation. And, this keypad formation can be so-called 'soft keys'.

FIG. 2 shows that a touch applied to a soft key is inputted through a front face of a terminal body.

The display module 151 is operable through an entire area or by being divided into a plurality of regions. In the latter case, a plurality of the regions can be configured interoperable.

For instance, an output window 151a and an input window 151b are displayed on the display module 151. A soft key 151c representing a digit for inputting a phone number or the like is outputted to the input window 151b. If the soft key 151c is touched, a digit corresponding to the touched soft key is outputted to the output window 151a. If the first manipulating unit 131 is manipulated, a call connection for the phone number displayed on the output window 151a is attempted.

The mobile terminal mentioned in this specification can include at least one of units or modules illustrated in FIG. 1. Also, the mobile terminal can display images by using at least one of a two-dimensional display mode and a three-dimensional display mode.

According to the present invention, a three-dimensional (3D) image may be a plane image made through computer graphic software, and a stereoscopic 3D image may be an image (4D image) that can allow a user to feel gradual depth and entity of an object on a monitor or screen at the same level as a real space. Hereinafter, an image displayed three-dimensionally can include both a 3D image and a stereoscopic 3D image.

Also, according to the present invention, examples of the 3D display mode include a stereoscopic mode (or glass mode, generally used for TV for home use), an autostereoscopic mode (or lenticular mode, generally used for mobile terminal), and a projection mode (or holographic mode).

According to the present invention, the mobile terminal 100 may be converted from the two-dimensional display mode to the three-dimensional display mode, and vice versa.

Moreover, when the mobile terminal 100 is converted from the two-dimensional display mode to the three-dimensional display mode, a part of all images, which is displayed three-dimensionally, can gradually be enlarged. Alternatively, when the mobile terminal 100 is converted from the three-dimensional display mode to the two-dimensional display mode, a part of all images, which is displayed two-dimensionally, can gradually be enlarged.

This conversion of the display mode will be described in more detail with reference to FIG. 3. For convenience of description, it is supposed that the two-dimensional display mode is converted to the three-dimensional display mode.

Referring to FIG. 3, if a conversion command signal from the two-dimensional display mode of the entire image to the three-dimensional display mode is input, the mobile terminal 100 can perform conversion to the three-dimensional display mode, whereby image parts 310 and 330 of the entire image, which are displayed three-dimensionally, can gradually be enlarged. At this time, image parts 320 and 340 displayed two-dimensionally can relatively be reduced.

Hereinafter, a method for converting a display mode according to the present invention will be described with reference to the accompanying drawings.

Figure 4:
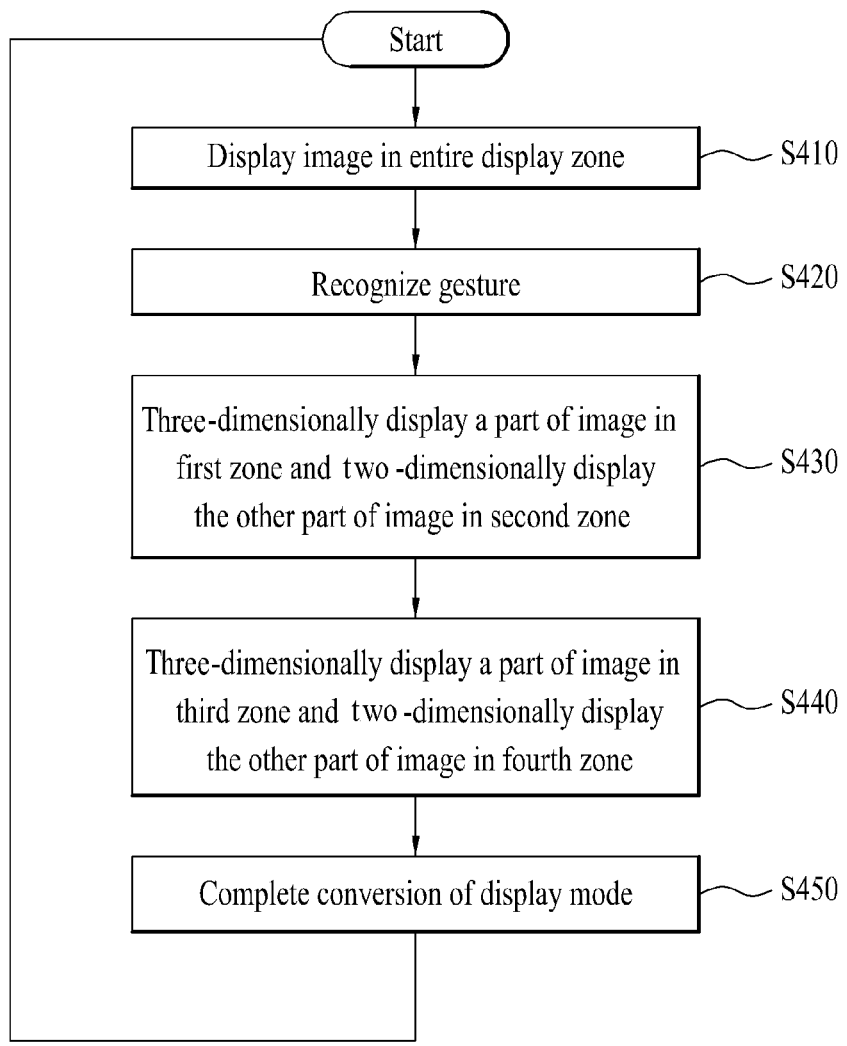
FIG. 4 is a flow chart illustrating a method for converting a display mode of a mobile terminal according to one embodiment of the present invention.

FIG. 4 is a flow chart illustrating a method for converting a display mode of a mobile terminal according to one embodiment of the present invention.

As illustrated in FIG. 4, the mobile terminal 100 displays an image in an entire display zone through a display module 151 under the control of a controller 180 (S410).

In the step S410, the mobile terminal 100 can display an image in the entire display zone two-dimensionally or three-dimensionally.

For example, the displayed image can include the image stored in the memory 160, the image taken by the camera 121, and the image received from an external terminal (or server). Also, the displayed image can include a still image or moving image.

If a gesture for conversion between the two-dimensional display and the three-dimensional display is externally input, the mobile terminal 100 recognizes the input gesture by using the sensing unit 140 under the control of the controller 180 (S420).

In more detail, in the step S420, the mobile terminal 100 can recognize whether the gesture has been input and a pattern of the input gesture.

In this case, the input gesture may be a gesture for conversion from the two-dimensional display to the three-dimensional display if the image is displayed two-dimensionally in the display step S410. Also, the input gesture may be a gesture for conversion from the three-dimensional display to the two-dimensional display if the image is displayed three-dimensionally in the display step S410.

Also, the input gesture, if a touch screen is provided as the display module 151, can include the number of touch times on the touch screen, a touch of a certain pressure, a touch of a certain time, a touch drag of a certain distance, a touch drag of a certain speed, and a touch drag in a certain direction. The aforementioned touch related gesture can be sensed by a touch sensing means (one element of the sensing unit 140). At this time, the touch screen can have a combination structure of the display module 151 and the touch sensing means (one element of the sensing unit 140).

Also, the input gesture can include a certain number of shimmer times of the mobile terminal 100 or a certain angle tilt of the mobile terminal 100 in a certain direction. The motion related gesture can be sensed by the motion sensor (one element of the sensing unit 140).

In the following description, it is supposed that the entire display zone can include first and second zones or third and fourth zones. Also, it is supposed that the first and third zones correspond to the three-dimensional zones and the second and fourth zones correspond to the two-dimensional zones.

If the mobile terminal recognizes the gesture in the step S420, it displays one part of the image (displayed in the step S410) in the first zone three-dimensionally and displays the other part of the image in the second zone two-dimensionally (S430).

In the step S430, if the recognized gesture is input for a specific part of the entire display zone, the mobile terminal 100 can include the first zone based on the specific part when the image displayed two-dimensionally in the step S410 (or when the recognized gesture commands conversion from the two-dimensional display mode to the three-dimensional display mode), and can include the second zone based on the specific part when the image displayed three-dimensionally in the step S410 (or when the recognized gesture commands conversion from the three-dimensional display mode to the two-dimensional display mode).

For example, if the recognized gesture is a touch on a specific point, the mobile terminal 100 can divide the entire display zone into a plurality of zones based on a horizontal line or a vertical line, which includes the specific point, and can set first and second zones of the divided zones.

Also, if the recognized gesture is a touch drag to a specific point, the mobile terminal 100 can set the zone to which the touch drag is input to the specific point to the first zone and the other zones to the second zone (in case of conversion from two-dimension to three-dimension), or can set the zone to which the touch drag is input to the specific point to the second zone and the other zones to the first zone (in case of conversion from three-dimension to two-dimension).

Also, if the recognized gesture is a touch drag to a specific point, the mobile terminal 100 can set a certain zone that includes the specific point to the first zone and the other zones to the second zone (in case of conversion from two-dimension to three-dimension), or can set the certain zone that includes the specific point to the second zone and the other zones to the first zone (in case of conversion from three-dimension to two-dimension).

Subsequently to the step S430, the mobile terminal 100 displays a part of the image (displayed in the step S410) in the third zone three-dimensionally and the other parts of the image in the fourth zone two-dimensionally, under the control of the controller 180 (S440).

In the steps S430 and S440, the mobile terminal 100 does not convert the current display mode (hereinafter, referred to as "first display mode") to the display mode (hereinafter, referred to as "second display mode") corresponding to the recognized gesture at one time, but gradually enlarges a zone of the entire display zone, which is converted to the second display mode), whereby a gradual converting process of the display mode can be provided to the user.

Also, in the step S410, if the image is displayed in the entire display zone two-dimensionally, the first zone may correspond to the third zone, and the fourth zone may correspond to the second zone.

For example, if the two-dimensional display mode is converted to the three-dimensional display mode, the three-dimensional zone may gradually be enlarged (the third zone includes the first zone), and the second zone may gradually be reduced (the second zone includes the fourth zone).

Also, in the step S410, if the image is displayed in the entire display zone three-dimensionally, the third zone may correspond to the first zone, and the second zone may correspond to the fourth zone.

For example, if the three-dimensional display mode is converted to the two-dimensional display mode, the two-dimensional zone may gradually be enlarged (the fourth zone includes the second zone), and the third zone may gradually be reduced (the first zone includes the third zone).

Also, if the first and second zones are configured in the step S430, the mobile terminal 100 configures the third zone so that the display mode is gradually converted in the first zone, and configures the fourth zone so that the display mode is gradually converted in the second zone, in the step S440.

Also, if the first and second zones are configured by gesture recognition in the step S430, the mobile terminal 100 configures the third and fourth zones so that the display mode is gradually converted in the first and second zones, respectively, even without gesture input.

Also, in the steps S430 and S440, the mobile terminal 100 can configure the first and second zones or the third and fourth zones in accordance with the pattern of the recognized gesture.

For example, the mobile terminal 100 can configure the first and second zones in case of touch of the first pattern (for example, touch for a first time, touch of one time, touch of a first pressure, touch drag of a first distance, and touch drag of a first speed), and can configure the third and fourth zones in case of touch of the second pattern (for example, touch for a second time, touch of two times, touch of a second pressure, touch drag of a second distance, and touch drag of a second speed). At this time, the second time, the second pressure, the second distance and the second speed are greater than the first time, the first pressure, the first distance and the first speed, respectively, and the touch of the first pattern and the touch of the second pattern can be input continuously.

Also, the mobile terminal 100 can configure the first and second zones in case of shimmer of one time (or tilt in a first direction and tilt as much as a first angle in a first direction), and can configure the third and fourth zones in case of shimmer of two times (or tilt in a second direction and tilt as much as a second angle in a first direction). At this time, the first and second directions are different from each other, and the second angle may be greater than the first angle.

Also, if the image is displayed two-dimensionally in the step S410, a designated operation of the first zone or the third zone is input to the mobile terminal 100 in the steps S430 and S440. If the image is displayed three-dimensionally in the step S410, a designated operation of the second zone or the fourth zone is input to the mobile terminal 100 in the steps S430 and S440. In this case, the designated operation of the first or fourth zone may be input to the mobile terminal 100 through the user input unit 130. In particular, if the mobile terminal 100 includes a touch screen, the designated operation may be input to the touch screen.

Accordingly, the controller 180 can set the first or fourth zone to correspond to the designated operation of the first or fourth zone.

Hereinafter, a sequential converting process of the display mode will be described in more detail.

First of all, a sequential converting process of the display mode based on barrier enabling/disabling control will be described.

If a gesture to command conversion from the two-dimensional display mode to the three-dimensional display mode is input in the step S410, the controller 180 can enable a barrier corresponding to the first zone or the third zone to display the three-dimensional image in the first or third zone. As the barrier corresponding to the first or third zone is enabled, the three-dimensional image can be displayed in the first or third zone.

Moreover, if the three-dimensional zone is sequentially enlarged from the first zone to the third zone, the controller 180 can sequentially enable the barrier corresponding to the first zone and the barrier corresponding to the third zone.

Also, if a gesture to command conversion from the three-dimensional display mode to the two-dimensional display mode is input in the step S410, the controller 180 can disable a barrier corresponding to the second zone or the fourth zone to display the two-dimensional image in the second or fourth zone. As the barrier corresponding to the second or fourth zone is disabled, the two-dimensional image can be displayed in the second or fourth zone.

Moreover, if the two-dimensional zone is sequentially enlarged from the first zone to the third zone, the controller 180 can sequentially disable the barrier corresponding to the second zone and the barrier corresponding to the fourth zone.

This will be described in more detail with reference to the accompanying drawings.

Figure 5A:
FIG. 5A to FIG. 5C are screen schematic views illustrating that a two-dimensional display mode is partially converted to a three-dimensional display mode depending on a touch time in accordance with the present invention.
Figure 5B:
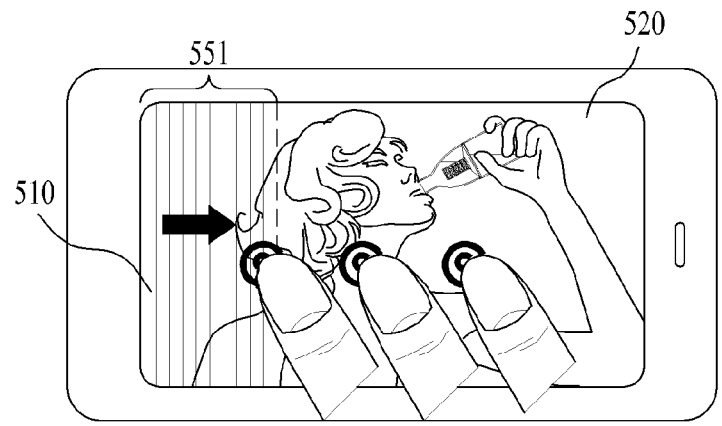
Figure 5C:
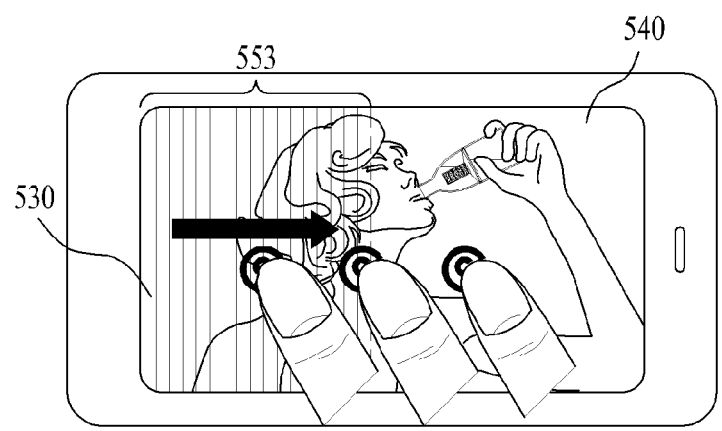

FIG. 5A to FIG. 5C are screen schematic views illustrating that a two-dimensional display mode is partially converted to a three-dimensional display mode depending on a touch time in accordance with the present invention.

If a multi-touch based on three fingers (three fingers are exemplary to display conversion to the three-dimensional display mode) is input for a first time (for example, 2 seconds) in a stated that the image is displayed in the entire display zone in accordance with the two-dimensional display mode (disabling of the entire barrier) (FIG. 5A), the mobile terminal 100 performs the three-dimensional display mode in the first zone 510 by enabling the barrier 551 corresponding to the first zone 510 and maintains the two-dimensional display mode in the second zone 520 (FIG. 5B).

If the multi-touch based on three fingers is input for a second time (for example, 4 seconds) in FIG. 5A, or if the multi-touch based on three fingers is further maintained for the first time in addition to the second time in FIG. 5B, the mobile terminal 100 performs the three-dimensional display mode in the third zone 530 by enabling the barrier 553 corresponding to the third zone 530 and maintains the two-dimensional display mode in the fourth zone 540 (FIG. 5C).

In other words, it is noted that if the touch time becomes longer, the three-dimensional zone is gradually enlarged and the two-dimensional zone is gradually reduced.

Figure 6A:
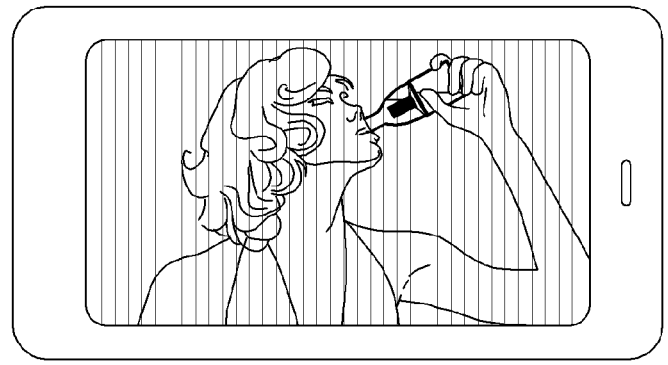
FIG. 6A to FIG. 6C are screen schematic views illustrating that a three-dimensional display mode is partially converted to a two-dimensional display mode depending on a touch time in accordance with the present invention.
Figure 6B:
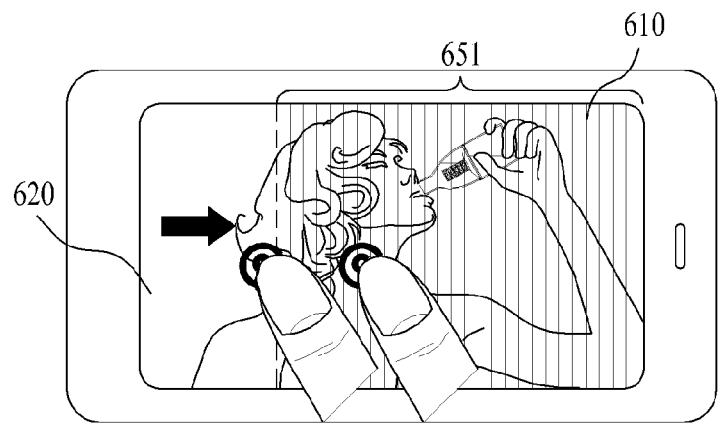
Figure 6C:
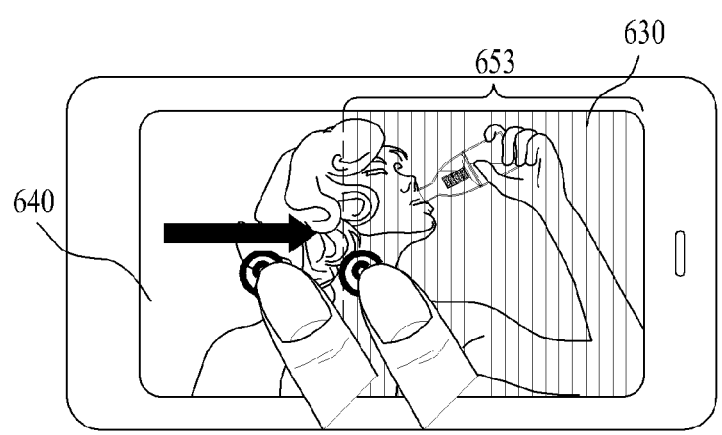

FIG. 6A to FIG. 6C are screen schematic views illustrating that a three-dimensional display mode is partially converted to a two-dimensional display mode depending on a touch time in accordance with the present invention.

If a multi-touch based on two fingers (two fingers are exemplary to display conversion to the two-dimensional display mode) is input for a first time (for example, 2 seconds) in a stated that the image is displayed in the entire display zone in accordance with the three-dimensional display mode (enabling of the entire barrier 650) (FIG. 6A), the mobile terminal 100 performs the two-dimensional display mode in the second zone 620 by disabling the barrier corresponding to the second zone 620 and maintains the three-dimensional display mode in the first zone 610 (FIG. 6B). At this time, the barrier 651 corresponding to the first zone 610 is still enabled.

If the multi-touch based on two fingers is input for a second time (for example, 4 seconds) in FIG. 6A, or if the multi-touch based on two fingers is further maintained for the first time in addition to the second time in FIG. 6B, the mobile terminal 100 performs the two-dimensional display mode in the fourth zone 640 by disabling the barrier corresponding to the fourth zone 640 and maintains the three-dimensional display mode in the third zone 630 (FIG. 6C). At this time, the barrier 653 corresponding to the third zone 630 is still enabled.

In other words, it is noted that if the touch time becomes longer, the two-dimensional zone is gradually enlarged and the three-dimensional zone is gradually reduced.

Figure 7A:
FIG. 7A to FIG. 7C are screen schematic views illustrating that a two-dimensional display mode is partially converted to a three-dimensional display mode depending on a touch drag in accordance with the present invention.
Figure 7B:
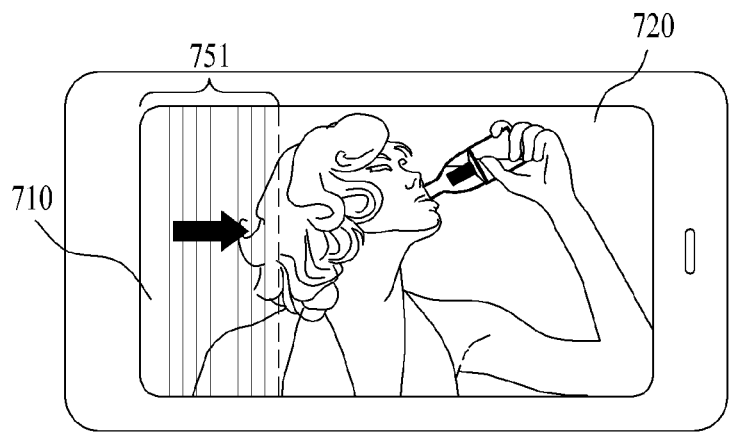
Figure 7C:
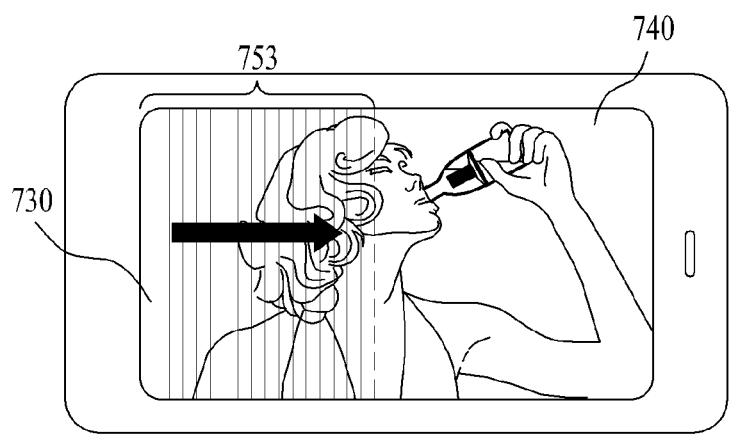

FIG. 7A to FIG. 7C are screen schematic views illustrating that a two-dimensional display mode is partially converted to a three-dimensional display mode depending on a touch drag in accordance with the present invention.

If a tough drag equivalent to a first distance is input in a stated that the image is displayed in the entire display zone in accordance with the two-dimensional display mode (enabling of the entire barrier), the mobile terminal 100 sets the input point of the touch drag and the zone corresponding to the first distance to a first zone 710 (FIG. 7A).

The mobile terminal 100 performs the three-dimensional display mode in the first zone 710 by enabling a barrier 751 corresponding to the first zone 710, and maintains the two-dimensional display mode in a second zone 720 (FIG. 7B).

The mobile terminal 100 performs the three-dimensional display mode in a third zone 730 by enabling a barrier 753 corresponding to the third zone 730 and maintains the two-dimensional display mode in a fourth zone 740 (FIG. 7C).

In other words, it is noted that if the touch drag distance becomes longer, the first zone is set more greatly.

Figure 8A:
FIG. 8A to FIG. 8C are screen schematic views illustrating that a three-dimensional display mode is partially converted to a two-dimensional display mode depending on a touch drag in accordance with the present invention.
Figure 8B:
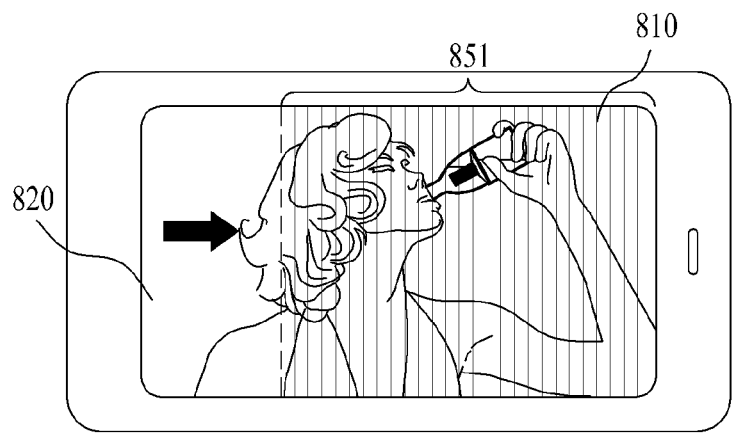
Figure 8C:
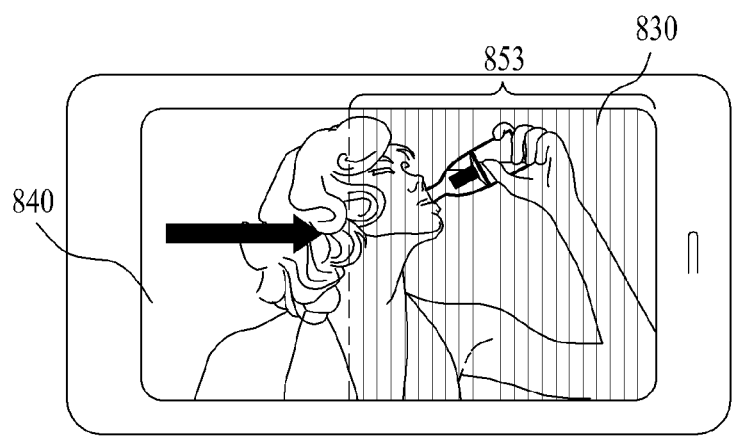

FIG. 8A to FIG. 8C are screen schematic views illustrating that a three-dimensional display mode is partially converted to a two-dimensional display mode depending on a touch drag in accordance with the present invention.

If a tough drag equivalent to a first distance is input in a stated that the image is displayed in the entire display zone in accordance with the three-dimensional display mode (enabling of the entire barrier), the mobile terminal 100 sets the input point of the touch drag and the zone corresponding to the first distance to a second zone 820 (FIG. 8A).

The mobile terminal 100 performs the two-dimensional display mode in the second zone 820 by disabling a barrier corresponding to the second zone 820, and maintains the three-dimensional display mode in a first zone 810 by continuing to enable the corresponding barrier 851 in the first zone 810 (FIG. 8B).

The mobile terminal 100 performs the two-dimensional display mode in a fourth zone 840 by disabling a barrier corresponding to a fourth zone 840 sequentially converted from the second zone 820 and maintains the three-dimensional display mode in a third zone 830 by continuing to enable the corresponding barrier 853 (FIG. 8C).

In other words, it is noted that if the touch drag distance becomes longer, the second zone is set more greatly.

Figure 9A:
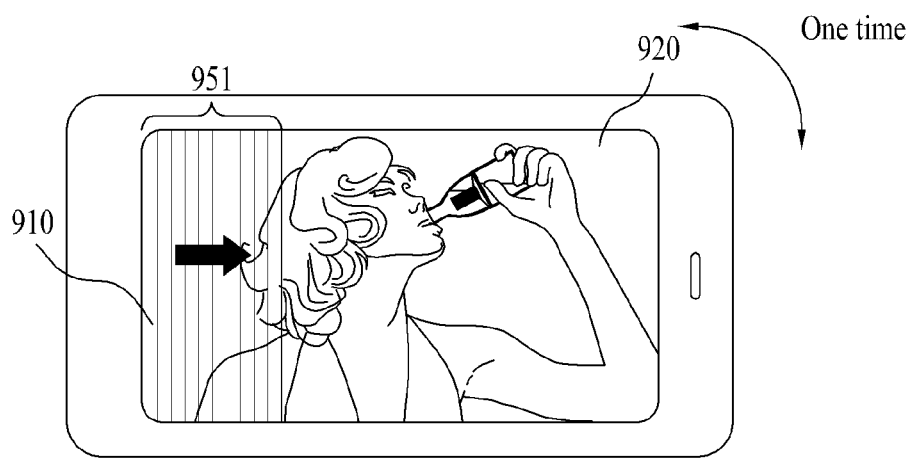
FIG. 9A and FIG. 9B are screen schematic views illustrating that a two-dimensional display mode is partially converted to a three-dimensional display mode depending on the number of shimmer times in accordance with the present invention.
Figure 9B:
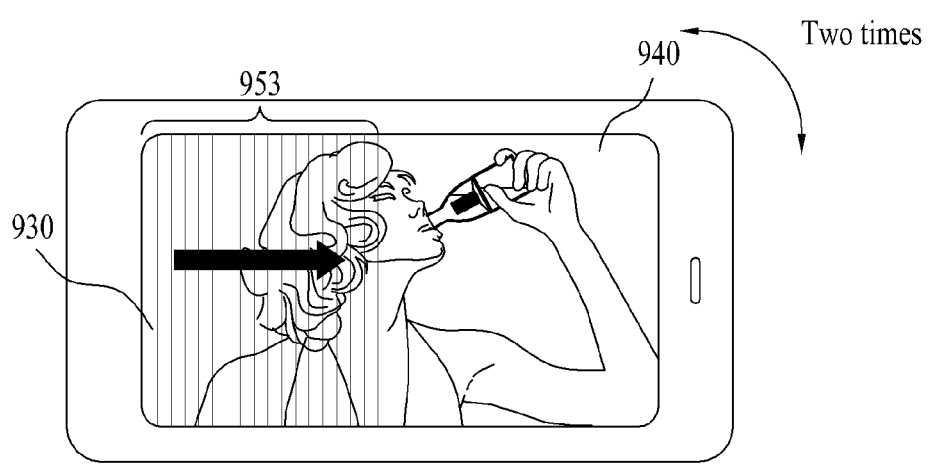

FIG. 9A and FIG. 9B are screen schematic views illustrating that a two-dimensional display mode is partially converted to a three-dimensional display mode depending on the number of shimmer times in accordance with the present invention.

If shimmer of one time is input in a stated that the image is displayed in the entire display zone in accordance with the two-dimensional display mode (enabling of the entire barrier), the mobile terminal 100 performs the three-dimensional display mode in a first zone 910 by enabling a barrier 951 corresponding to the first zone 910, and maintains the two-dimensional display mode in a second zone 920 (FIG. 9A).

If shimmer of two times is continuously input in a state that the image is displayed three-dimensionally in the entire display zone, or if shimmer of one time is further input in FIG. 9A, the mobile terminal 100 performs the three-dimensional display mode in a third zone 930 by enabling a barrier 953 corresponding to the third zone 930, and maintains the two-dimensional display mode in a fourth zone 940 (FIG. 9B).

In other words, it is noted that if the number of shimmer times increases, the three-dimensional zone is gradually enlarged and the two-dimensional zone is gradually reduced.

Figure 10A:
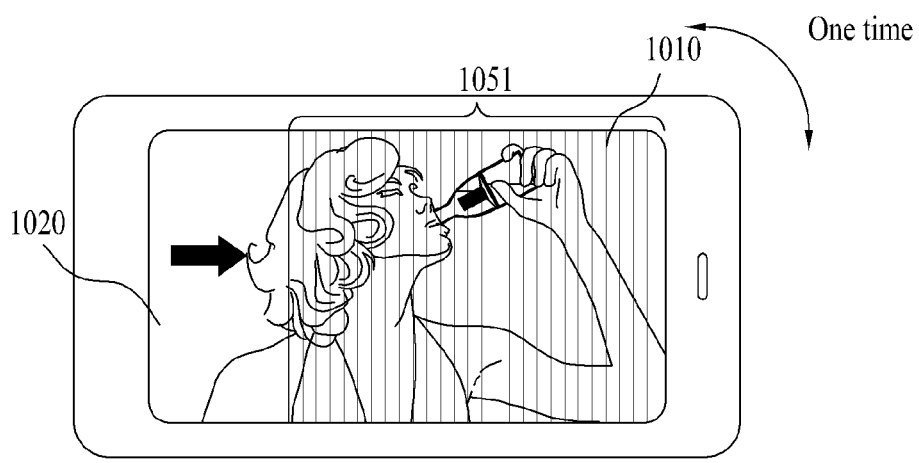
FIG. 10A and FIG. 10B are screen schematic views illustrating that a three-dimensional display mode is partially converted to a two-dimensional display mode depending on the number of shimmer times in accordance with the present invention.
Figure 10B:
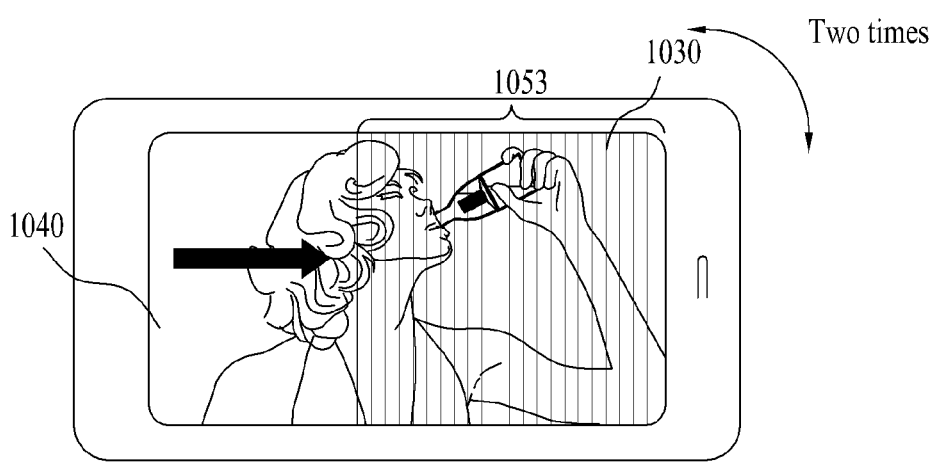

FIG. 10A and FIG. 10B are screen schematic views illustrating that a three-dimensional display mode is partially converted to a two-dimensional display mode depending on the number of shimmer times in accordance with the present invention.

If shimmer of one time is input in a stated that the image is displayed in the entire display zone in accordance with the three-dimensional display mode (enabling of the entire barrier), the mobile terminal 100 performs the two-dimensional display mode in a second zone 1020 by disabling a barrier corresponding to the second zone 1020, and maintains the three-dimensional display mode in a first zone 1010 by continuing to enable the corresponding barrier 1051 (FIG. 10A).

If shimmer of two times is continuously input in a state that the image is displayed three-dimensionally in the entire display zone, or if shimmer of one time is further input in FIG. 10A, the mobile terminal 100 performs the two-dimensional display mode in a fourth zone 1040 by disabling a barrier corresponding to the fourth zone 1040, and maintains the three-dimensional display mode in a third zone 1030 by continuing to enable the corresponding barrier 1053 (FIG. 10B).

In other words, it is noted that if the number of shimmer times increases, the two-dimensional zone is gradually enlarged and the three-dimensional zone is gradually reduced.

Figure 11A:
FIG. 11A and FIG. 11B are screen schematic views illustrating that a two-dimensional display mode is partially converted to a three-dimensional display mode depending on a touch point in accordance with the present invention.
Figure 11B:
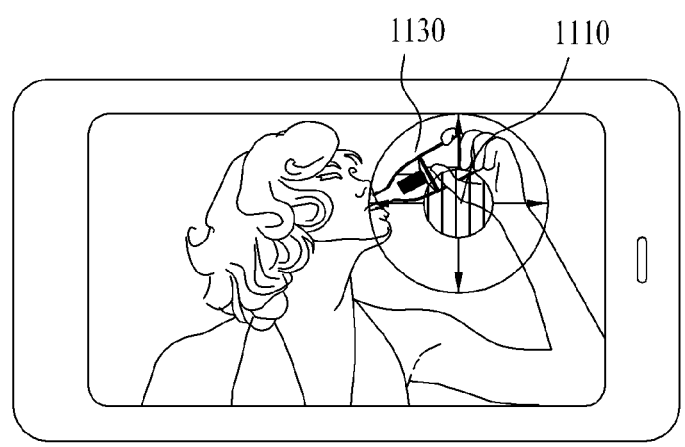

FIG. 11A and FIG. 11B are screen schematic views illustrating that a two-dimensional display mode is partially converted to a three-dimensional display mode depending on a touch point in accordance with the present invention. For convenience of description, it is supposed that the two-dimensional display mode is converted to the three-dimensional display mode.

If a touch action on a specific point of the screen is input (FIG. 11A), the mobile terminal 100 sets a first zone 1110 based on the specific point where the touch action is input, and displays an image part corresponding to the first zone 1110 in accordance with the three-dimensional display mode by enabling the barrier corresponding to the first zone 1110 (FIG. 11B). At this time, the two-dimensional display mode can be performed in the other zones except for the first zone 1110.

Moreover, if a touch action on a specific point (or random point within the first zone 1110) is additionally input in FIG. 11B, or if a touch action on a specific point is further maintained for a certain time after the first zone 1110 is set, the mobile terminal 100 sets a third zone 1130 enlarged from the first zone 1110, and displays an image part corresponding to the third zone 1130 in accordance with the three-dimensional display mode by enabling the barrier corresponding to the third zone 1130. At this time, the two-dimensional display mode can be performed in the other zones except for the third zone 1130.

Next, a sequential converting process of a display mode based on binocular image control will be described.

In the steps S430 and S440, the mobile terminal 100 displays a right eye image and a left eye image (i.e., binocular images) in first and third zones and a right eye image (or left eye image) in second and fourth zones under the control of the controller 180.

In more detail, the image is displayed three-dimensionally in the zone (first and third zones) where the binocular images are displayed, and the image is displayed two-dimensionally in the zone (second and fourth zones) where the right image (or left image) is displayed.

This will be described in more detail with reference to the accompanying drawings.

For convenience of description, when one of binocular images (right eye image and left eye image) is displayed, it is referred to as two-dimensional display, and when binocular images are displayed together, it is referred to as three-dimensional display. Also, it is noted that a barrier corresponding to a three-dimensional zone is enabled and a barrier corresponding to a two-dimensional zone is disabled or enabled. Even though the barrier corresponding to the two-dimensional zone is enabled, if the binocular images are not displayed, the image can be displayed in accordance with the two-dimensional display mode.

Figure 12A:
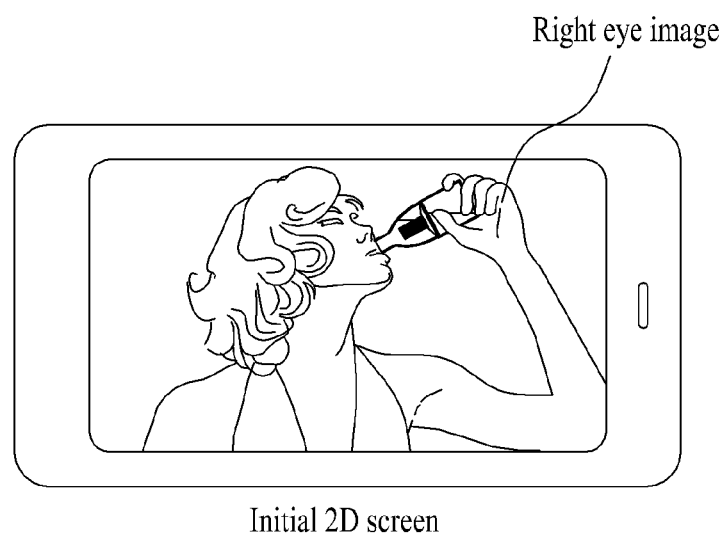
FIG. 12A to FIG. 12C are screen schematic views illustrating that a two-dimensional display mode is partially converted to a three-dimensional display mode by controlling binocular images depending on the number of shimmer times in accordance with the present invention.
Figure 12B:
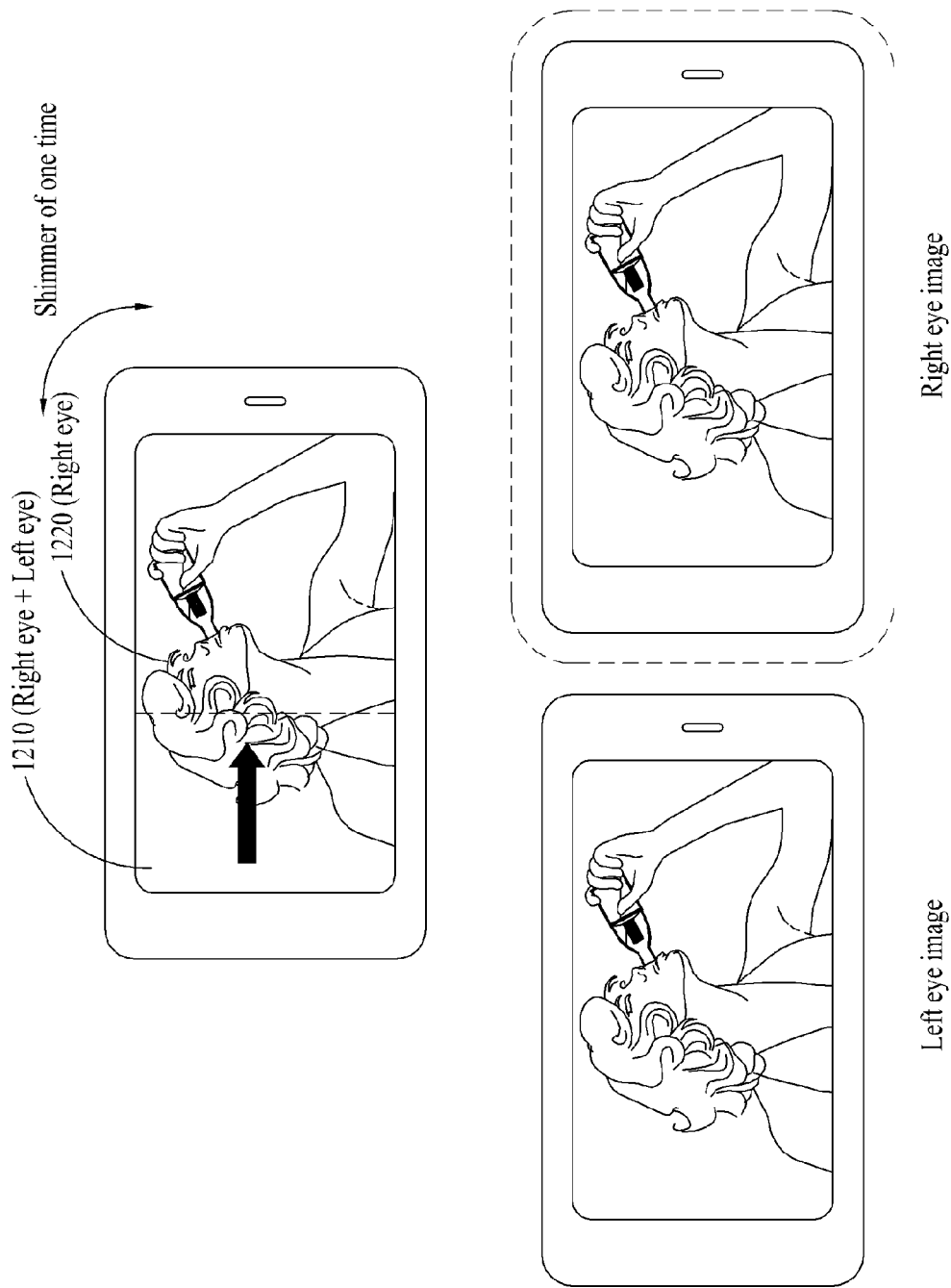
Figure 12C:
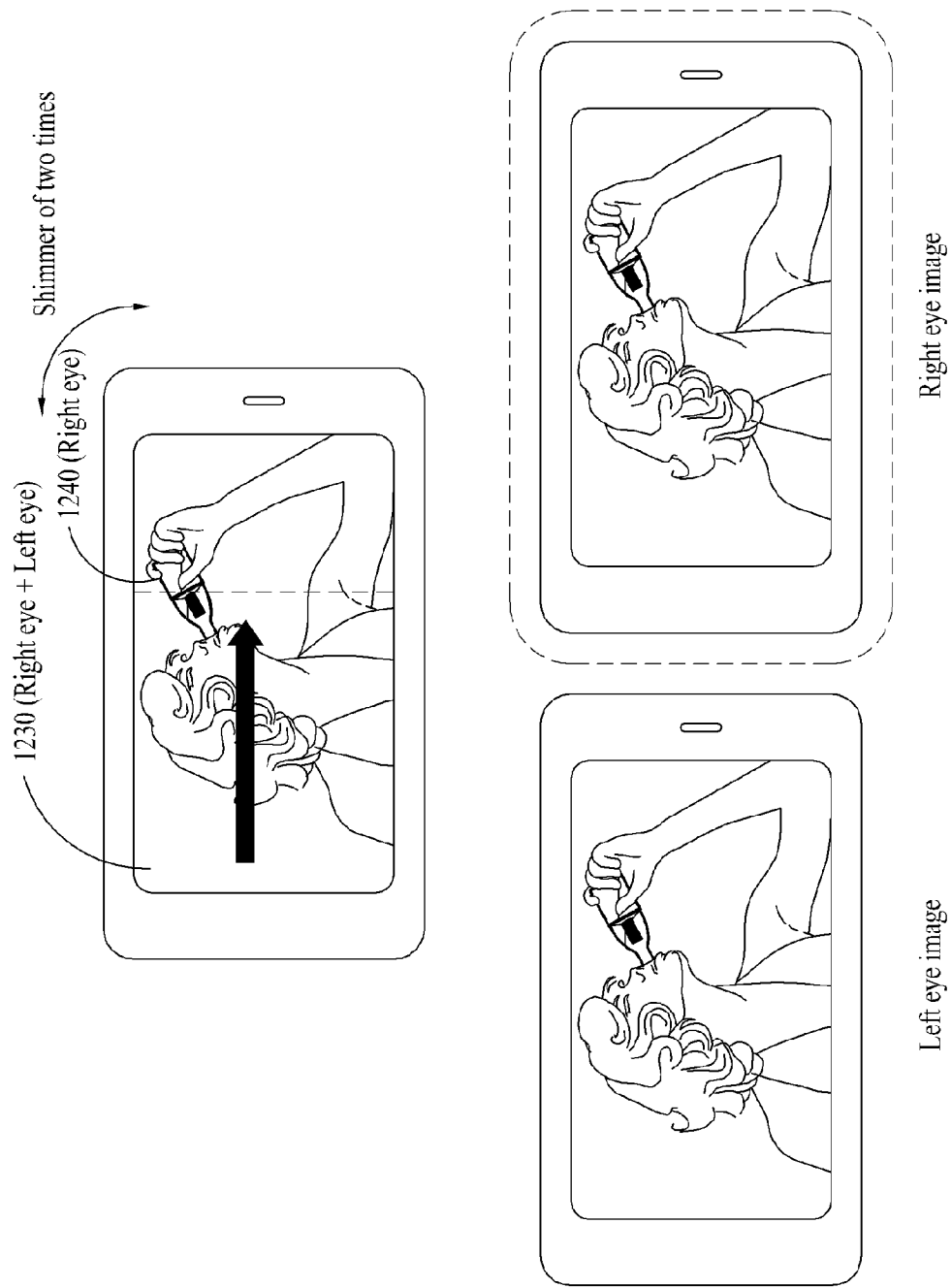

FIG. 12A to FIG. 12C are screen schematic views illustrating that a two-dimensional display mode is partially converted to a three-dimensional display mode by controlling binocular images depending on the number of shimmer times in accordance with the present invention.

If shimmer of one time is input in a state that a right eye image is only displayed in the entire display zone (two-dimensional display mode) (FIG. 12A), the mobile terminal 100 displays a left eye image and a right eye image in a first zone 1210 together (three-dimensional display mode), and displays the right eye image only in a second zone 1220 (two-dimensional display mode) (FIG. 12B).

Also, if shimmer of two times is continuously input in FIG. 12A or if shimmer of one time is further input in FIG. 12B, the mobile terminal 100 displays the left eye image and the right eye image in a third zone 1230 together (three-dimensional display mode), and displays the right eye image only in a fourth zone 1240 (two-dimensional display mode) (FIG. 12C).

In this case, it is noted that if the number of shimmer times increases, the three-dimensional zone is gradually enlarged and the two-dimensional zone is gradually reduced.

Figure 13A:
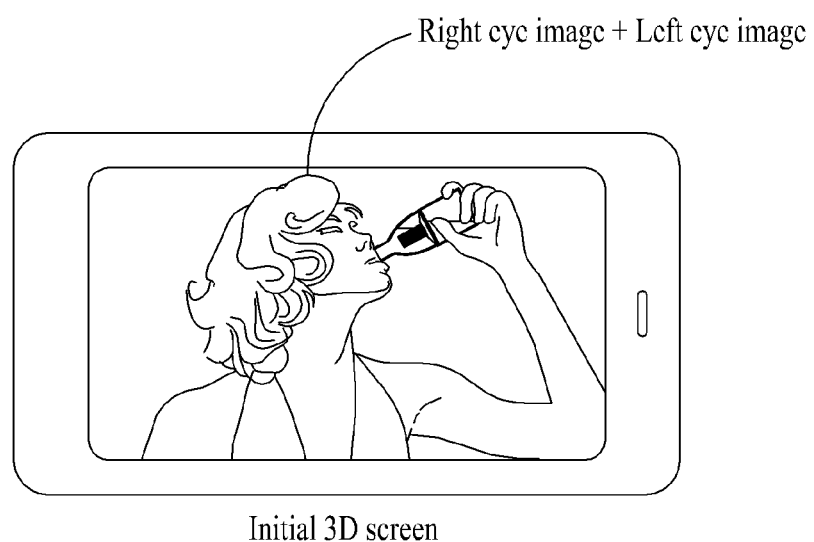
Figure 13B:
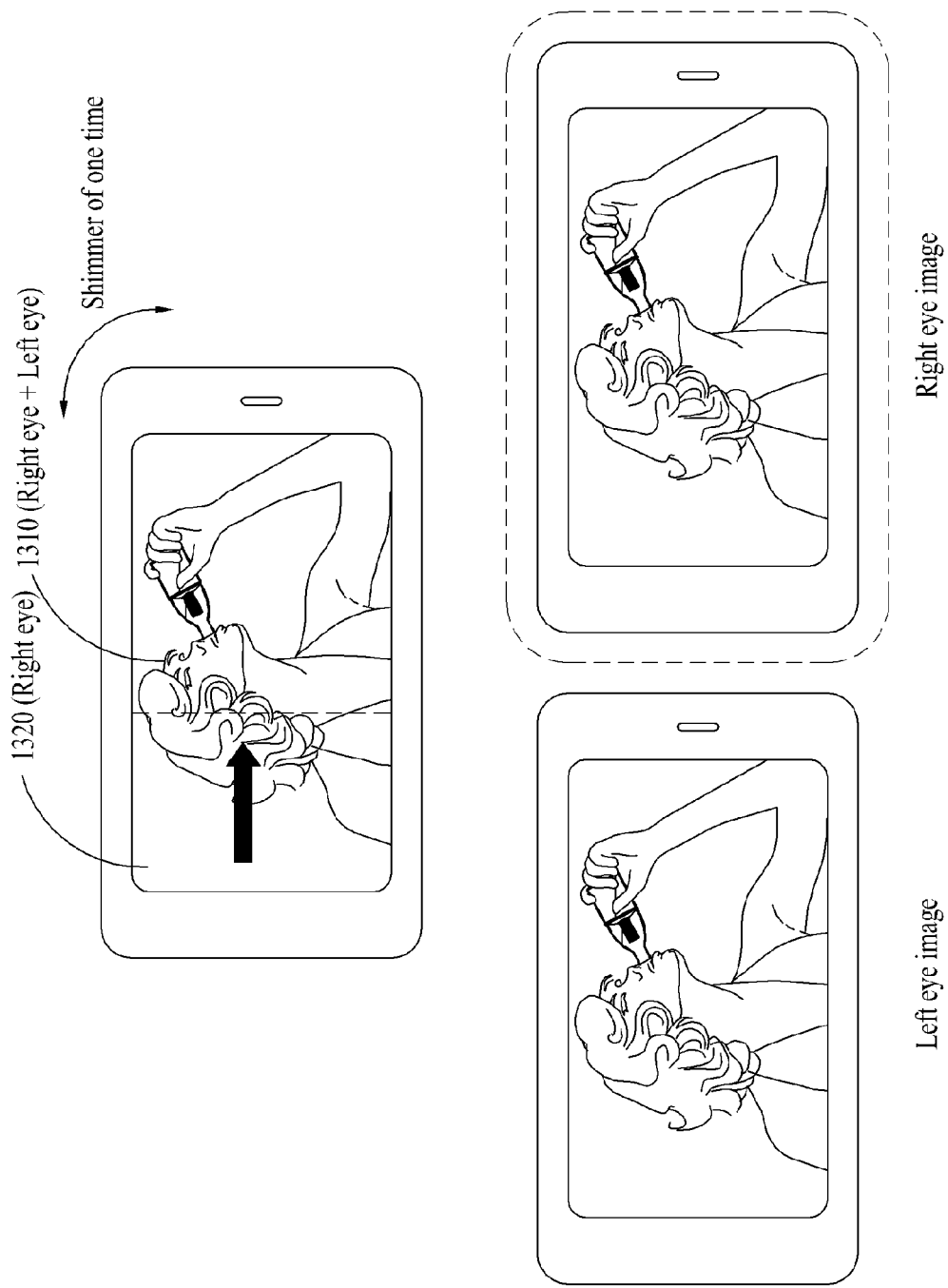

FIG. 13A to FIG. 13C are screen schematic views illustrating that a three-dimensional display mode is partially converted to a two-dimensional display mode by controlling binocular images depending on the number of shimmer times in accordance with the present invention.

If shimmer of one time is input in a state that binocular images are displayed in the entire display zone (three-dimensional display mode) (FIG. 13A), the mobile terminal 100 displays a right eye image in a second zone 1320 (two-dimensional display mode), and displays the binocular images in a first zone 1310 (three-dimensional display mode) (FIG. 13B).

Also, if shimmer of two times is continuously input in FIG. 13A or if shimmer of one time is further input in FIG. 13B, the mobile terminal 100 displays the right eye image in a fourth zone 1340 (two-dimensional display mode), and displays the binocular images in a third zone 1330 (three-dimensional display mode) (FIG. 13C).

In this case, it is noted that if the number of shimmer times increases, the two-dimensional zone is gradually enlarged and the three-dimensional zone is gradually reduced.

Figure 14B:
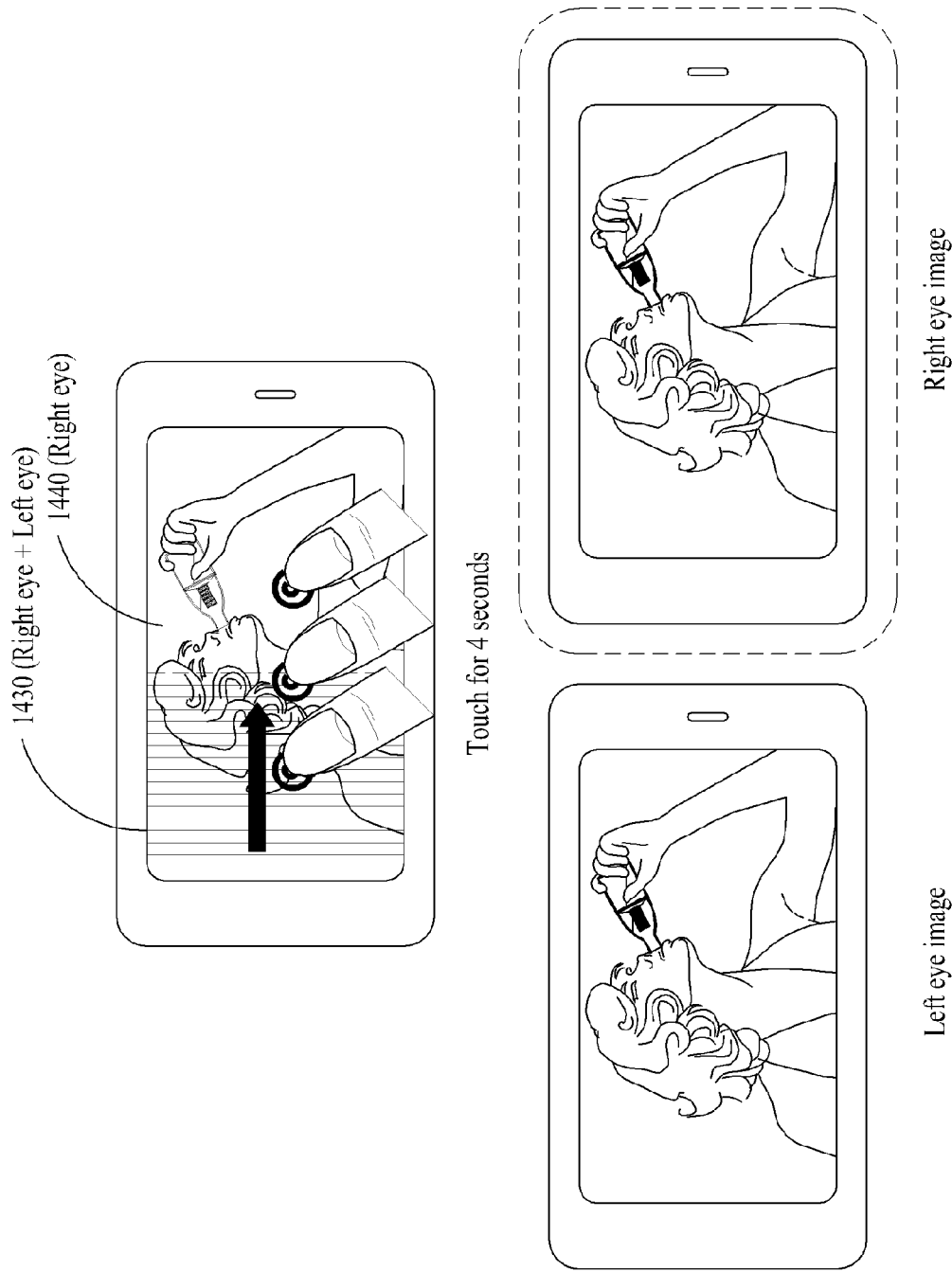

FIG. 14A and FIG. 14B are screen schematic views illustrating that a two-dimensional display mode is partially converted to a three-dimensional display mode by controlling binocular images depending on a touch time in accordance with the present invention.

If a multi-touch based on three fingers is input for a first time (for example, 2 seconds) in a state that a right eye image is only displayed in the entire display zone in accordance with a two-dimensional display mode, the mobile terminal 100 displays binocular images together in a first zone 1410 (three-dimensional display mode), and displays the right eye image only in a second zone 1420 (two-dimensional display mode) (FIG. 14A).

Also, if a multi-touch is input for a second time, or if the multi-touch of FIG. 14A is further maintained for the first time in addition to the second time, the mobile terminal 100 displays binocular images together in a third zone 1430 (three-dimensional display mode), and displays the right eye image only in a fourth zone 1440 (two-dimensional display mode) (FIG. 14B).

In this case, it is noted that if the touch time increases, the three-dimensional zone is gradually enlarged and the two-dimensional zone is gradually reduced.

Figure 15B:
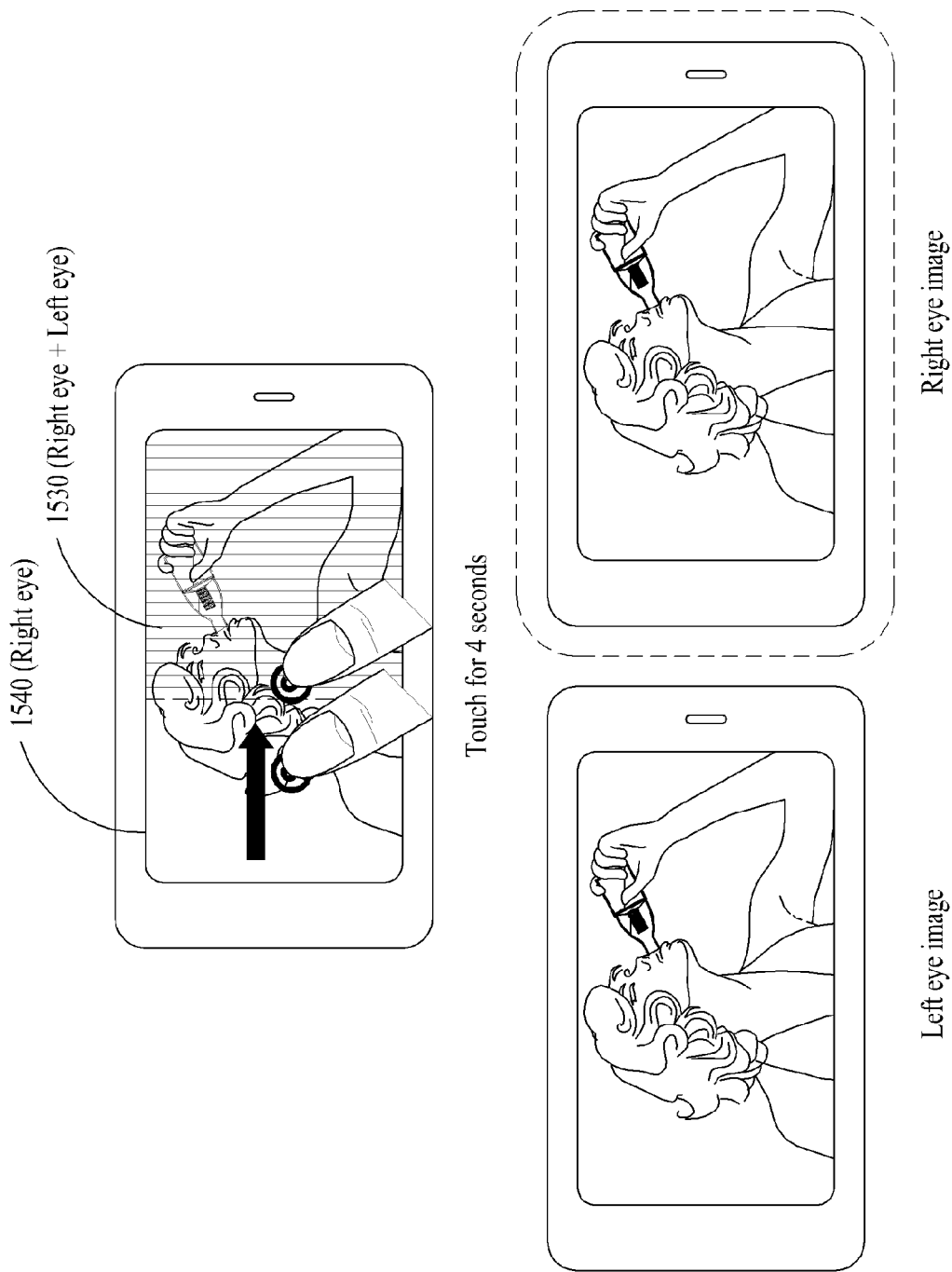

FIG. 15A and FIG. 15B are screen schematic views illustrating that a three-dimensional display mode is partially converted to a two-dimensional display mode by controlling binocular images depending on a touch time in accordance with the present invention.

If a multi-touch based on two fingers is input for a first time (for example, 2 seconds) in a state that binocular images are displayed in the entire display zone in accordance with a three-dimensional display mode, the mobile terminal 100 displays the right eye image in a second zone 1520 (two-dimensional display mode), and displays the binocular images in a first zone 1510 (three-dimensional display mode) (FIG. 15A).

Also, if a multi-touch is input for a second time, or if the multi-touch of FIG. 15A is further maintained for the first time in addition to the second time, the mobile terminal 100 displays the right eye image in a fourth zone 1540 (two-dimensional display mode), and displays the binocular images in a third zone 1530 (three-dimensional display mode) (FIG. 15B).

In this case, it is noted that if the touch time increases, the two-dimensional zone is gradually enlarged and the three-dimensional zone is gradually reduced.

Returning to FIG. 4, the mobile terminal 100 completes the converting process of the display mode from the two-dimensional display mode (or three-dimensional display mode) in the step S410 to the three-dimensional display mode (or two-dimensional display mode) under the control of the controller 180 (S450).

Accordingly, as the converting process of the display mode is completed, the mobile terminal 100 displays the image in the entire display zone in accordance with the three-dimensional display mode (or two-dimensional display mode) corresponding to the converted display mode (see S410).

For example, if the two-dimensional display mode is converted to the three-dimensional display mode, the three-dimensional zone is gradually enlarged, whereby the three-dimensional display mode is performed in the entire display zone. In this case, it is regarded that the converting process of the display mode is completed.

If the converting process of the display mode is completed in a part of the entire display zone, the image is displayed in the part of the entire display zone in accordance with the three-dimensional display mode (or two-dimensional display mode) corresponding to the converted display mode.

According to the present invention, if a specific one of a plurality of image items displayed on the screen is selected, the mobile terminal 100 displays a image corresponding to the specific image item three-dimensionally under the control of the controller 180, whereby the three-dimensional zone is gradually enlarged.

This will be described in more detail with reference to FIG. 16.

Figure 16:
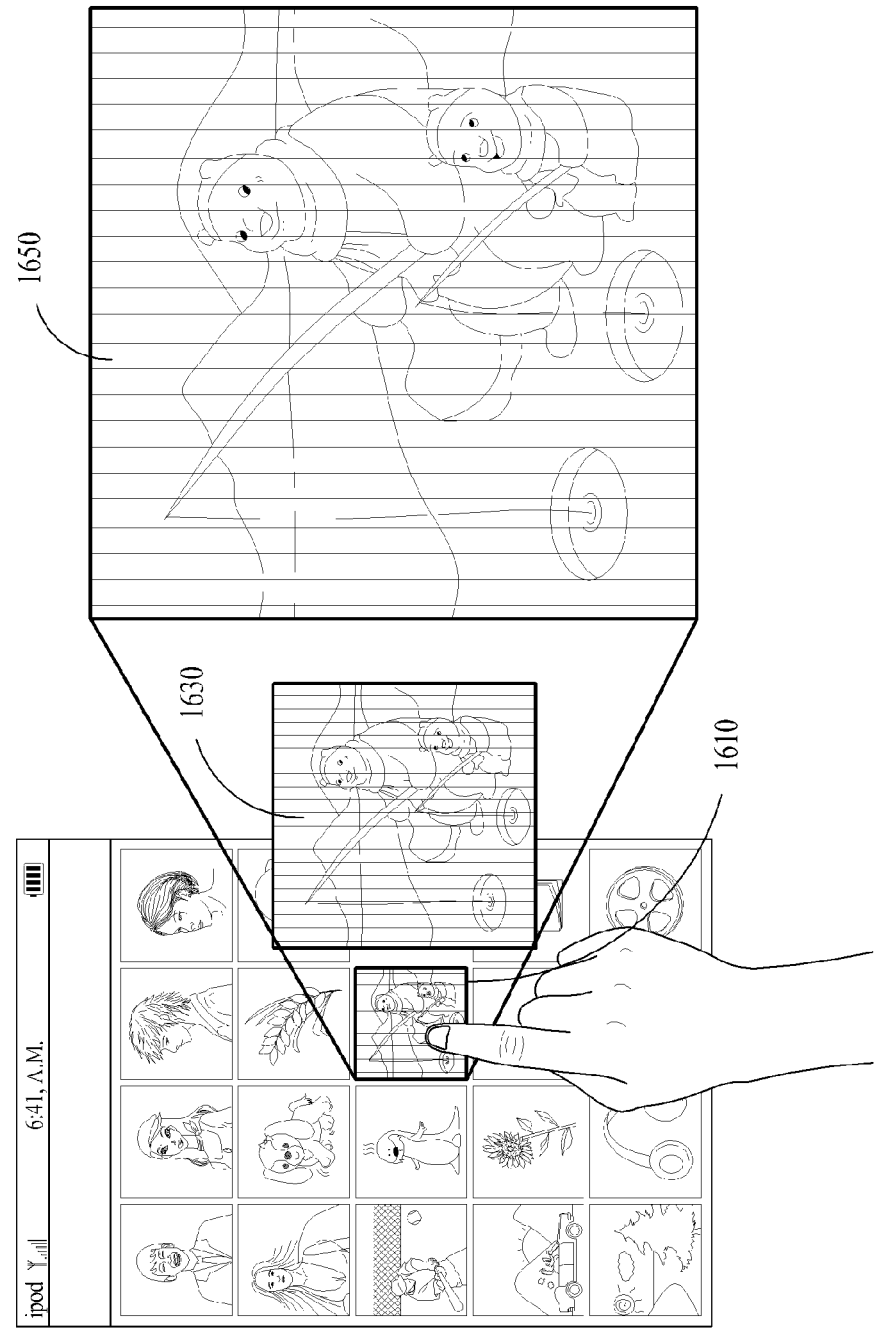
FIG. 16 is a screen schematic view illustrating that a three-dimensional display zone is enlarged in displaying any one of a plurality of images displayed on the screen three-dimensionally in accordance with the present invention.

Referring to FIG. 16, if a touch on a specific one of a plurality of image items is input from a user, the mobile terminal 100 displays a image corresponding to the specific item three-dimensionally, whereby the three-dimensional zone is gradually enlarged in the order of 1610→1630→1650.

At this time, the barrier corresponding to the three-dimensional zone 1610→1630→1650 is gradually increased in proportional to the three-dimensional zone 1610→1630→1650 which is gradually enlarged.

According to the present invention, if a specific one of a plurality of image items displayed on the screen is selected, the mobile terminal 100 displays a image corresponding to the specific image item three-dimensionally in the three-dimensional zone, which is previously designated, under the control of the controller 180. In this case, the previously designated three-dimensional zone may mean that the position or size of the three-dimensional zone is previously designated.

For example, referring to FIG. 17A, a three-dimensional zone 1710, which is previously designated, may be provided fixedly in a specific position (especially, right upper end). Referring to FIG. 17B, a three-dimensional zone 1720, which is previously designated, may be provided to include a periphery zone of the specific image item. In FIG. 17B, the position of the three-dimensional zone 1720 may be varied depending on the position of the specific image item.

Moreover, if a channel selection zone of broadcast outputs is touched, the mobile terminal displays a broadcast screen provided from a channel (for example, previous/next channel of current channel or preference channel) corresponding to the touched channel selection, zone three-dimensionally.

For example, referring to FIG. 17C, a three-dimensional zone 1730, which is previously designated, may be provided fixedly at a specific position (especially, right lower end) of the screen.

According to the present invention, in a state that the image is displayed in the entire display zone in accordance with the two-dimensional display mode (or three-dimensional display mode), the mobile terminal displays a specific image three-dimensionally (or two-dimensionally) within the three-dimensional zone set by the user, under the control of the controller 180.

This will be described in more detail with reference to FIG. 18A to FIG. 19B.

Referring to FIG. 18A, if a touch action on a specific image item 1801 is input in a state that a plurality of image items are displayed, the mobile terminal 100 displays an allowable range where the three-dimensional zone can be set (a). Accordingly, the user can set the three-dimensional zone within the allowable range 1810 by using a touch drag or multi-touch. At this time, the allowable range 1810 can include the specific image item 1801.

If the three-dimensional zone is completely set in FIG. 18A(a) (for example, if a touch action for setting the three-dimensional zone is removed/completed), the mobile terminal 100 displays the image corresponding to the specific image item 1801 within the set three-dimensional zone 1820, three-dimensionally (b).

Referring to FIG. 18B, if a multi-touch drag based on a plurality of pointers is input after a specific image item is selected in a state that a plurality of image items are displayed, the mobile terminal 100 sets a zone corresponding to the multi-touch drag to a three-dimensional zone 1830 (a).

And, the mobile terminal 100 displays the image corresponding to the specific image item within the set three-dimensional zone 1830, three-dimensionally (b).

Figure 19A:
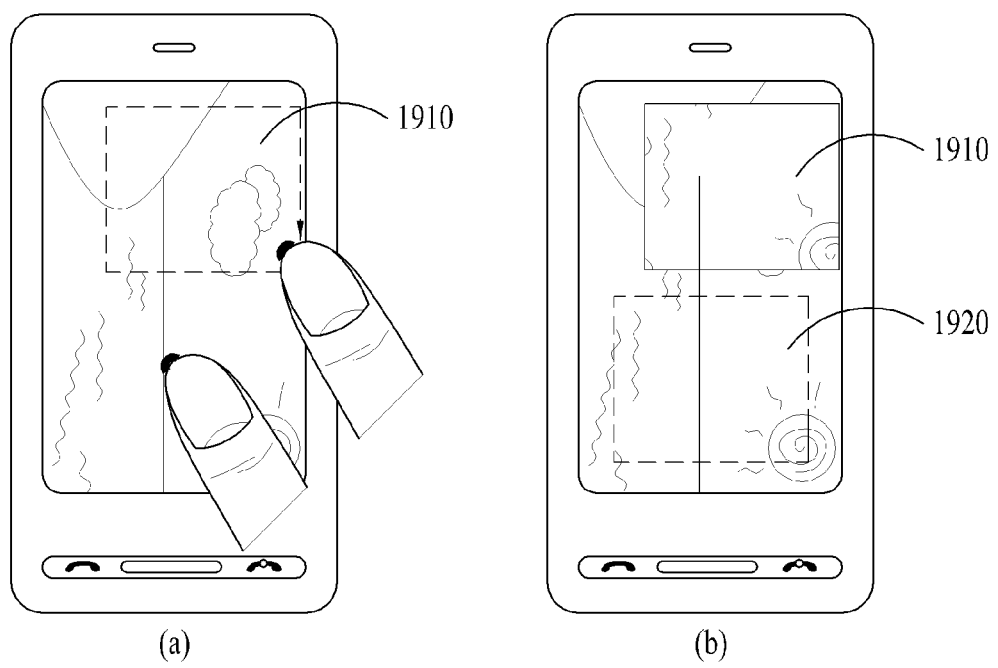

Referring to FIG. 19A, a selection action ① of a specific object of direction images and a setting action ② of a three-dimensional zone 1910 are input to the mobile terminal 100 while the mobile terminal 100 is displaying direction images in the entire display zone in accordance with the two-dimensional display mode (a).

The mobile terminal 100 displays a image 1920 corresponding to the specific object, three-dimensionally, within the three-dimensional zone 1910 set by the setting action ②(b).

At this time, the setting action ② includes a closed curve drawing action (zone surrounded by a closed curve is set to a three-dimensional zone), a touch drag action (a polygon having a touch drag distance as a diagonal line or one side is set to a three-dimensional zone), and a multi-touch action (a polygon having a distance between pointers inputting a multi-touch as a diagonal line or one side is set to a three-dimensional zone).

Referring to FIG. 19B, while the mobile terminal 100 is displaying direction images in the entire display zone in accordance with the two-dimensional display mode, if a touch drag action ① in a downward direction or a touch drag action ② in a horizontal direction is input (a), the mobile terminal displays a part of the images in a first zone 1930 three-dimensionally by dividing the screen into two parts, and displays the other part of the images in a second zone 1940 two-dimensionally (b).

At this time, the divided point can be determined to correspond to the point where the touch drag action ② is input, or a drag distance or drag speed based on the touch drag action ①.

According to one embodiment of the present invention, the above-described display mode converting methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

The mobile terminal according to at least one embodiment of the present invention configured as above and the method for converting a display mode thereof have the following advantages.

First of all, if the converting process between the two-dimensional display mode and the three-dimensional display mode is performed, the converted zone is gradually enlarged, whereby the natural converting process can be provided to the user.

In addition, since the converting process between the two-dimensional display mode and the three-dimensional display mode can be performed for a partial zone, the converting process can be performed for a certain zone desired by the user.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A mobile terminal comprising:
a display module displaying an image in an entire display zone;
a sensing unit recognizing a gesture, wherein the gesture is input externally and is for conversion between two-dimensional display and three-dimensional display; and
a controller controlling the display module to perform a first display action for three-dimensionally displaying a first part of the image in a first zone of the entire display zone and two-dimensionally displaying a second part of the image in a second zone as the gesture is recognized, and to perform a second display action subsequently to the first display action for three-dimensionally displaying a third part of the image in a third zone of the entire display zone and two-dimensionally displaying a fourth part of the image in a fourth zone, wherein, if the image is two-dimensionally displayed in the entire display zone before the gesture is input, the first and fourth zones are included in the third and second zones, respectively, wherein if the image is three-dimensionally displayed in the entire display zone before the gesture is input, the third and second zones are included in the first and fourth zones, respectively, wherein the controller partially enables a barrier of the display module by activating only a first region of the barrier for the first display action or by activating only a second region of the barrier for the second display action, if the image is two-dimensionally displayed in the entire display zone before the gesture is input, wherein the first region of the barrier corresponds to the first zone, and the second region of the barrier corresponds to the third zone, and wherein the controller is further configured to:

control the display module to display a plurality of image items, receive a user's selection of an area on the display module, the area including at least one of the plurality of image items, and in response to receiving the user's selection of the area, display the at least one image item three-dimensionally.

2. The mobile terminal as claimed in claim 1, wherein, if a touch screen is provided as the display module, the gesture includes at least one of a certain number of touch times on the touch screen, a touch of a certain pressure, a touch of a certain time, a multi-touch, a touch drag of a certain distance, and a touch drag of a certain speed.

3. The mobile terminal as claimed in claim 1, wherein, if the gesture is input for a specific part of the entire display zone, the controller configures the first zone based on the specific part in the first display action when the image is two-dimensionally displayed in the entire display zone before the gesture is input, and configures the second zone based on the specific part in the first display action when the image is three-dimensionally displayed in the entire display zone before the gesture is input.

4. The mobile terminal as claimed in claim 1, further comprising:

a user input unit accepting an external input action for designating the first zone or the third zone if the image is two-dimensionally displayed in the entire display zone before the gesture is input, wherein the controller sets the first zone or the third zone to correspond to the input action.

5. The mobile terminal as claimed in claim 1, wherein the controller configures the third zone to be sequentially converted from the first zone and configures the fourth zone to be sequentially converted from the second zone in the second display action.

6. The mobile terminal as claimed in claim 1, wherein the controller sequentially enables the barrier corresponding to the third zone if the first zone is sequentially enlarged to the third zone.

7. The mobile terminal as claimed in claim 1, wherein the controller partially disables the barrier corresponding to the second or fourth zone for two-dimensional display in the second zone or the fourth zone after the gesture is input if the image is three-dimensionally displayed in the entire display zone before the gesture is input.

8. The mobile terminal as claimed in claim 7, wherein the controller sequentially disables the barrier corresponding to the fourth zone if the second zone is sequentially enlarged to the fourth zone.

9. The mobile terminal as claimed in claim 1, wherein the controller displays a right eye image and a left eye image in the first zone and the right eye image in the second zone in the first display action, and displays the right eye image and the left eye image in the third zone and the right eye image in the fourth zone in the second display action.

10. The mobile terminal of claim 1, wherein the controller is further configured to, in response to receiving the user's selection of the area, convert the at least one image item displayed two-dimensionally to be displayed three-dimensionally.

11. A method for converting a display mode of a mobile terminal, the method comprising:

a first display step of displaying an image in an entire display zone of a display module;

recognizing a gesture externally input for conversion between two-dimensional display and three-dimensional display;

a second display step of three-dimensionally displaying a first part of the image in a first zone of the entire display zone and two-dimensionally displaying a second part of the image in a second zone as the gesture is recognized; and a third display step of three-dimensionally displaying a third part of the image in a third zone of the entire display zone and two-dimensionally displaying a fourth part of the image in a fourth zone subsequently to the second display step, wherein, if the image is two-dimensionally displayed in the first display step, the first and fourth zones are included in the third and second zones, respectively, wherein if the image is three-dimensionally displayed in the first display step, the third and second zones are included in the first and fourth zones, respectively, wherein the second display step comprises partially enabling a barrier of a display module by activating only a first region of the barrier, if the image is two-dimensionally displayed in the first display step, wherein the third display step comprises partially enabling the barrier by activating only a second region of the barrier, if the image is two-dimensionally displayed in the first display step, wherein the first region of the barrier corresponds to the first zone, and the second region of the barrier corresponds to the third zone, and wherein the method further comprises:

displaying a plurality of image items on the display module, receiving a user's selection of an area on the display module, the area including at least one of the plurality of image items, and in response to receiving the user's selection of the area, displaying the at least one image item three-dimensionally.

12. The method as claimed in claim 11, wherein, if the gesture is input for a specific part of the entire display zone, the second display step includes configuring the first zone based on the specific part when the image is two-dimensionally displayed in the first display step, and configuring the second zone based on the specific part when the image is three-dimensionally displayed in the first display step.

13. The method as claimed in claim 11, wherein the third display step includes configuring the third zone to be sequentially converted from the first zone and configuring the fourth zone to be sequentially converted from the second zone.

14. The method as claimed in claim 11, further comprising: partially disabling the barrier corresponding to the second or fourth zone in the second or third display step if the image is three-dimensionally displayed in the first display step.

15. The method as claimed in claim 11, wherein the second display step includes displaying a right eye image and a left eye image in the first zone and the right eye image in the second zone, and the third display step includes displaying the right eye image and the left eye image in the third zone and the right eye image in the fourth zone.

16. The method of claim 11, wherein the displaying of the at least one image item includes converting the at least one image item displayed two-dimensionally to be displayed three-dimensionally.

* * * * *